(12) United States Patent
Zheng et al.

(10) Patent No.: US 12,042,783 B2
(45) Date of Patent: Jul. 23, 2024

(54) SURFACE-MODIFIED ALUMINA COMPOUND FOR GASOLINE EXHAUST GAS APPLICATIONS

(71) Applicant: JOHNSON MATTHEY PUBLIC LIMITED COMPANY, London (GB)

(72) Inventors: Qinghe Zheng, Wayne, PA (US); Jing Lu, Wayne, PA (US); Michael Howard, Wayne, PA (US)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/154,198

(22) Filed: Jan. 13, 2023

(65) Prior Publication Data

US 2023/0241587 A1    Aug. 3, 2023

Related U.S. Application Data

(60) Provisional application No. 63/267,520, filed on Feb. 3, 2022.

(51) Int. Cl.
*B01J 21/04* (2006.01)
*B01D 53/94* (2006.01)
(Continued)

(52) U.S. Cl.
CPC .......... *B01J 23/464* (2013.01); *B01D 53/945* (2013.01); *B01J 21/04* (2013.01); *B01J 23/002* (2013.01);
(Continued)

(58) Field of Classification Search
CPC . B01J 23/002; B01J 23/02; B01J 23/04; B01J 23/10; B01J 23/34; B01J 23/38;
(Continued)

(56) References Cited

U.S. PATENT DOCUMENTS 4,237,032 A * 12/1980 Evans .................. B01J 23/8933
502/328
4,624,940 A * 11/1986 Wan .......................... B01J 37/04
502/262

(Continued)

FOREIGN PATENT DOCUMENTS

WO    2018/089964 A2    5/2018

OTHER PUBLICATIONS

Cimino, et al., "Methane combustion on perovskites-based structured catalysts", Catalysis Today, vol. 59, No. 1-2, pp. 19-31, Jun. 2000.

(Continued)

*Primary Examiner* — Cam N. Nguyen

(57) ABSTRACT

Provided is a composition comprising alumina, the alumina being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5.

21 Claims, 4 Drawing Sheets

(51) Int. Cl.

| | | |
|---|---|---|
| B01J 23/00 | (2006.01) | |
| B01J 23/02 | (2006.01) | |
| B01J 23/04 | (2006.01) | |
| B01J 23/10 | (2006.01) | |
| B01J 23/34 | (2006.01) | |
| B01J 23/38 | (2006.01) | |
| B01J 23/40 | (2006.01) | |
| B01J 23/42 | (2006.01) | |
| B01J 23/44 | (2006.01) | |
| B01J 23/46 | (2006.01) | |
| B01J 23/48 | (2006.01) | |
| B01J 23/54 | (2006.01) | |
| B01J 23/63 | (2006.01) | |
| B01J 23/70 | (2006.01) | |
| B01J 23/76 | (2006.01) | |
| B01J 23/83 | (2006.01) | |
| B01J 23/89 | (2006.01) | |
| B01J 35/04 | (2006.01) | |
| B01J 35/56 | (2024.01) | |
| B01J 37/02 | (2006.01) | |
| B01J 37/04 | (2006.01) | |
| B01J 37/08 | (2006.01) | |
| F01N 3/10 | (2006.01) | |
| F01N 3/28 | (2006.01) | |

(52) U.S. Cl.
CPC .............. *B01J 23/10* (2013.01); *B01J 23/34* (2013.01); *B01J 23/44* (2013.01); *B01J 23/83* (2013.01); *B01J 35/56* (2024.01); *B01J 37/0203* (2013.01); *B01J 37/0205* (2013.01); *B01J 37/0213* (2013.01); *B01J 37/0236* (2013.01); *B01J 37/0248* (2013.01); *B01J 37/086* (2013.01); *F01N 3/101* (2013.01); *F01N 3/2828* (2013.01); *B01D 2255/1021* (2013.01); *B01D 2255/1023* (2013.01); *B01D 2255/1025* (2013.01); *B01D 2255/9155* (2013.01); *F01N 2370/04* (2013.01)

(58) Field of Classification Search
CPC ... B01J 23/40; B01J 23/42; B01J 23/44; B01J 23/46; B01J 23/48; B01J 23/54; B01J 23/63; B01J 23/70; B01J 23/76; B01J 23/83; B01J 23/89; B01J 23/894; B01J 23/8389; B01J 37/0213; B01J 37/0221; B01J 37/0236; B01J 37/0248; B01J 37/04; B01J 21/04; B01J 23/8946; B01J 35/04; B01J 37/088; B01J 35/56; B01D 53/945; F01N 3/101; F01N 3/2828
See application file for complete search history.

(56) References Cited

U.S. PATENT DOCUMENTS

| | | | | |
|---|---|---|---|---|
| 4,849,398 A * | 7/1989 | Takada | ............... | B01D 71/0271 502/303 |
| 4,921,829 A * | 5/1990 | Ozawa | ............... | B01D 53/945 502/302 |
| 5,185,311 A * | 2/1993 | Tabata | ............... | B01J 23/83 502/304 |
| 5,242,881 A * | 9/1993 | Tang | ............... | B01J 23/10 502/251 |
| 5,882,616 A * | 3/1999 | Ziebarth | ............... | B01J 23/63 423/247 |
| 5,990,038 A * | 11/1999 | Suga | ............... | B01D 53/945 502/328 |
| 6,129,862 A | 10/2000 | Munakata | | |
| 6,531,425 B2 | 3/2003 | Golden | | |
| 7,070,752 B2 * | 7/2006 | Zeng | ............... | C01B 3/386 423/652 |
| 7,504,085 B2 * | 3/2009 | Yang | ............... | B01J 23/10 423/625 |
| 7,514,055 B2 | 4/2009 | Golden | | |
| 9,352,301 B2 * | 5/2016 | Ito | ............... | B01J 37/0244 |
| 10,252,217 B2 * | 4/2019 | Zhang | ............... | B01J 21/04 |
| 10,843,174 B2 * | 11/2020 | Coupland | ............... | B01J 37/0215 |
| 11,179,704 B2 * | 11/2021 | Zheng | ............... | B01J 37/036 |
| 11,364,484 B2 * | 6/2022 | Fisher | ............... | B01J 35/002 |
| 11,439,983 B2 * | 9/2022 | Nagaoka | ............... | B01J 21/066 |
| 11,559,793 B2 * | 1/2023 | Zheng | ............... | B01J 23/34 |
| 11,643,333 B2 * | 5/2023 | Jaroniec | ............... | C01F 7/021 423/115 |
| 11,691,882 B2 * | 7/2023 | Kuhn | ............... | B01J 35/1023 502/328 |
| 11,794,166 B1 * | 10/2023 | Kuhn | ............... | C01F 17/32 |
| 2004/0191150 A1 * | 9/2004 | Yano | ............... | C04B 35/2675 423/263 |
| 2009/0023580 A1 * | 1/2009 | Tanaka | ............... | B01J 37/033 502/201 |
| 2009/0208396 A1 * | 8/2009 | Yang | ............... | B01J 35/19 423/247 |
| 2009/0264283 A1 * | 10/2009 | Yang | ............... | B01D 53/9418 502/303 |
| 2009/0286680 A1 * | 11/2009 | Hirano | ............... | B01J 23/898 502/326 |
| 2009/0324470 A1 | 12/2009 | Alamdari | | |
| 2010/0227758 A1 * | 9/2010 | Yang | ............... | B01J 35/0006 502/303 |
| 2012/0264597 A1 * | 10/2012 | Devi | ............... | B01J 37/18 423/263 |
| 2015/0182954 A1 | 7/2015 | Nazarpoor et al. | | |
| 2017/0095803 A1 * | 4/2017 | Nazarpoor | ............... | B01J 23/34 |
| 2019/0336950 A1 | 11/2019 | Zheng | | |
| 2020/0179908 A1 * | 6/2020 | Simmance | ............... | B01J 35/0013 |
| 2020/0276536 A1 | 9/2020 | Zheng | | |

OTHER PUBLICATIONS

Onrubia-Calvo, et al., "Tailoring perovskite surface composition to design efficient lean NOx trap Pd-La1-xAxCoO3/Al2O3-type catalysts (with A = Sr or Ba)", Applied Catalysis B Environmental, Elsevier, vol. 266, Jan. 2020.

Labhsetwar, et al., "Alumina supported, perovskite oxide based catalytic materials and their auto-exhaust application", Applied Catalysis B. Environmental, Elsevier, vol. 33, No. 2, pp. 165-173, Sep. 2001.

Simmance, et al., "Evaluation of perovskite catalysts prepared by flame spray pyrolysis for three-way catalyst activity under simulated gasoline exhaust feeds", Catalysis Today, vol. 320, pp. 40-50, 2019.

A. Newton, M. Dynamic Adsorbate/Reaction Induced Structural Change of Supported Metal Nanoparticles□: Heterogeneous Catalysis and Beyond. Chemical Society Reviews 2008, 37 (12), 2644-2657. https://doi.org/10.1039/B707746G.

Alifanti, M.; Florea, M.; Cortes-Corberan, V.; Endruschat, U.; Delmon, B.; Pârvulescu, V. I. Effect of LaCoO3 Perovskite Deposition on Ceria-Based Supports on Total Oxidation of VOC. Catalysis Today 2006, 112 (1), 169-173. https://doi.org/10.1016/j.cattod.2005.11.017.

Alifanti, M.; Florea, M.; Pârvulescu, V. I. Ceria-Based Oxides as Supports for LaCoO3 Perovskite; Catalysts for Total Oxidation of VOC. Applied Catalysis B: Environmental 2007, 70 (1), 400-405. https://doi.org/10.1016/j.apcatb.2005.10.037.

Hammouda, Samia Ben et al., "Reactivity of a novelCeria—Perovskite composites CeO2—LaMO3 (M<ce:glyph name="dbnd"/>Cu, Fe) for the catalytic wet peroxidative oxidation of a new emergent pollutant 'Bisphenol F': Characterization, kinetic and mechanism studies," Applied Catalysis B: Environmental, Manuscript 2017.

(56) References Cited

OTHER PUBLICATIONS

Haribal, Vasudev Pralhad, et al. "Iron-Doped BaMnO3 for Hybrid Water Splitting and Syngas Generation with Exceptional Conversions," Dept. of Chemical and Biomolecular Engineering, North Carolina State Univ, Research News https://doi.org/10.1002/cssc.201700699.

Haribal, Vasudev Pralhad, et al. "Iron-Doped BaMnO3 for Hybrid Water Splitting and Syngas Generation," ChemSusChem 10, pp. 1-8 2017.

Keav, S.; Matam, S. K.; Ferri, D.; Weidenkaff, A. Structured Perovskite-Based Catalysts and Their Application as Three-Way Catalytic Converters—A Review. Catalysts 2014, 4 (3), 226-255. https://doi.org/10.3390/catal4030226.

Kubicek, Markus, et al., "Perovskite oxides—a review on a versatile material class for solar-to-fuel conversion processes," The Royal Society of Chemistry, J. Mater. Chem A. 5, pp. 11983-12000 2017.

Mishra, Amit, et al., "Oxygen Vacancy Creation Energy in Mn-Containing Perovskites: An Effective Indicator for Chemical Looping with Oxygen Uncoupling," Chem Mater. 31, pp. 689-698, 2019.

Rabelo-Neto, R. C.; Sales, H. B. E.; Inocencio, C. V. M.; Varga, E.; Oszko, A.; Erdohelyi, A.; Noronha, F. B.; Mattos, L. V. CO2 Reforming of Methane over Supported LaNiO3 Perovskite-Type Oxides. Applied Catalysis B: Environmental 2018, 221, 349-361. https://doi.org/10.1016/j.apcatb.2017.09.022.

Wang, Hai-Feng, et al., "A Model to Understand the Oxygen Vacancy Formation in Zr-Doped CeO2: Electrostatic Interaction and Structural Relaxation," J. Phys. Chem C 113, pp. 10229-10232, 2009.

Zhu, H.; Zhang, P.; Dai, S. Recent Advances of Lanthanum-Based Perovskite Oxides for Catalysis. ACS Catal. 2015, 5 (11), 6370-6385. https://doi.org/10.1021/acscatal.5b01667.

Zhu, Xing et al, "Perovskites as Geo-Inspired Oxygen Storage Materials for Chemical Looping and Three-Way Catalysis: A Perspective," ACS Catal. 8, pp. 8213-8236, 2018.

* cited by examiner

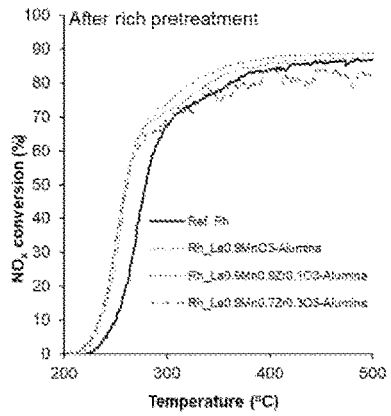
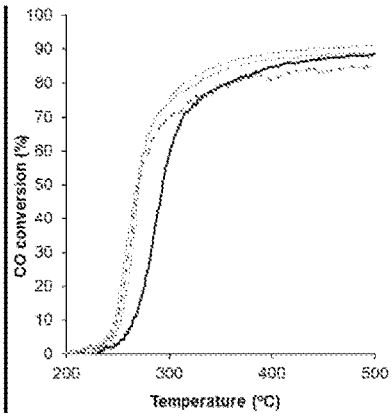
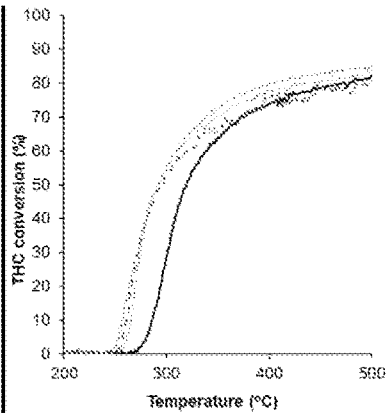
FIG. 8a  FIG. 8b  FIG. 8c
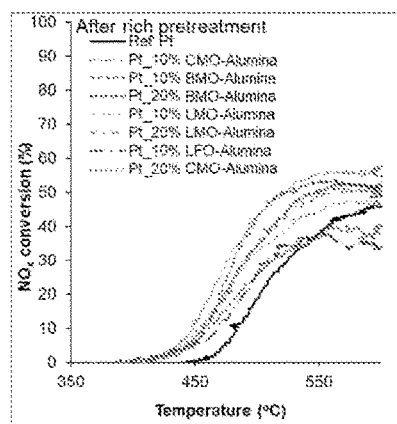
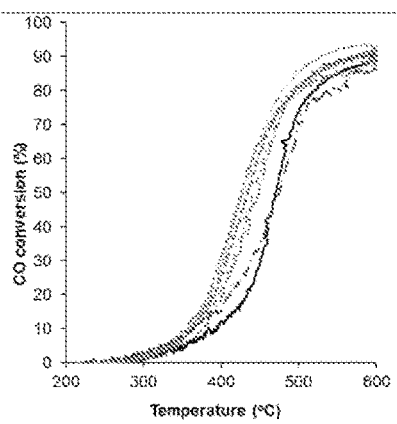
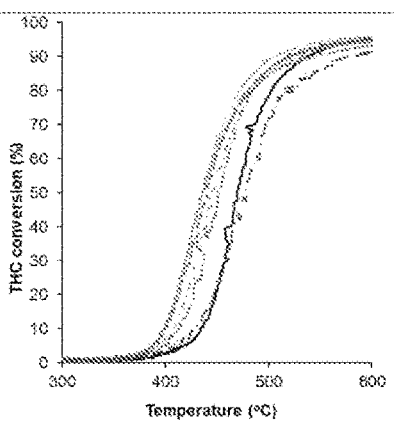
FIG. 9a  FIG. 9b  FIG. 9c
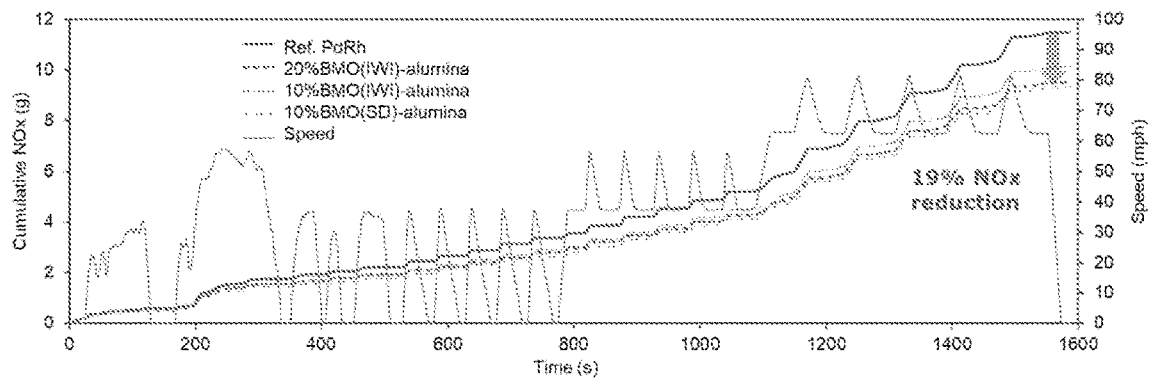
FIG. 10

SURFACE-MODIFIED ALUMINA COMPOUND FOR GASOLINE EXHAUST GAS APPLICATIONS

FIELD OF THE INVENTION

The invention relates to a composition comprising alumina, the alumina being surface-modified with a perovskite type compound, methods of manufacturing such a composition, compositions obtained or obtainable by such methods, a catalyst article, an emissions treatment system and a method of treating an exhaust gas.

BACKGROUND OF THE INVENTION

A three-way catalyst (TWC) allows simultaneous conversions (~98%) of CO, HCs and NOx from gasoline engine exhaust to innocuous compounds at stoichiometric air-to-fuel ratio. Specifically, the oxidation of CO and HCs to $CO_2$ and steam ($H_2O$) is mainly catalyzed by Pd, while the reduction of $NO_x$ to $N_2$ is mainly catalyzed by Rh. Modern TWCs use supported platinum group metal (hereinafter "PGM") catalysts (Pd, Rh, Pt, etc.) deposited on a single, double or multilayer support, with the support material consisting of metal oxides with high specific surface area, primarily stabilized alumina and ceria-containing oxygen storage materials. The supported catalyst is washcoated on a ceramic monolithic substrate.

Cerium oxide ($Ce_xO_y$), well known for its high oxygen storage capacity (OSC) due to the function of the $Ce^{4+}/Ce^{3+}$ redox pair, plays an important role in TWC performance. Besides providing high surface area for PGM metal dispersion, $Ce_xO_y$ can also assist the feed-back control of stoichiometric condition by uptaking or donating oxygen during fuel lean/rich perturbations. Further incorporation of zirconium oxide ($ZrO_2$) into $Ce_xO_y$ fluorite structure (denoted as CZO) improves the thermal stability of $Ce_xO_y$, and enhances the mobility of lattice oxygen through the formation of oxygen vacancies. Other proprietary elements (Y, Nd, La, Pr, etc.) are also added to OSC formulas to further enhance the TWC performance.

$ABO_{3-\delta}$ perovskite-type materials are known in the art and can exhibit significant swings in oxygen non-stoichiometry $\delta$ through the reaction with gas phase oxygen. Perovskites with advanced compositions also present OSC capacity and intrinsic TWC activity. Generally, the OSC and catalytic activity of perovskite oxides are largely dependent on the nature of the B-site cation, while the A-site cation is found to be important in the perovskite structural formation by influencing vacancy density and charge-valence balance. The oxygen uptake and release are associated with the existence of structural defects and the change of oxidation state of the B-site cation. At a temperature below 600° C., suprafacial oxygen species ($\alpha$) are adsorbed on the oxide surface, while at higher temperatures, bulk oxygen from the lattice, referred to as interfacial oxygen ($\beta$), are activated and they take part in the catalytic reaction according to the Mars-van-Krevelen mechanism. Furthermore, incorporation of PGM metal into the perovskite structure has been reported to yield an "intelligent catalyst" (PGM migration between bulk and surface at redox conditions), which leads to potential mitigation of metal sintering at severe automotive conditions.

However, the main limitation of using perovskites for emissions abatement emerged from their reduced ability to develop large surface areas (i.e. they have low surface-area-to-volume ratio). Moreover, they drastically sinter above 600° C., sometimes accompanied by phase transition/separation under redox conditions.

SUMMARY OF THE INVENTION

One aspect of the present disclosure is directed to a composition comprising alumina, the alumina being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5.

Another aspect of the present disclosure is directed to a method of manufacturing a composition comprising alumina, the alumina being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5, the method comprising: providing a solution comprising an organic acid, water, one or more salts of A, one or more salts of B and optionally one or more salts of A' and/or one or more salts of B'; contacting the solution with alumina to form a slurry; and heating the slurry.

Another aspect of the present disclosure is directed to a composition obtained or obtainable by the method of the above aspect.

Another aspect of the present disclosure is directed to a method of manufacturing a composition comprising alumina, the alumina being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5, the method comprising: contacting alumina with A, B, and optionally A' and/or B' using one or more salts of A, one or more salts of B and optionally one or more salts of A' and/or one or more salts of B' via incipient wetness impregnation to form an impregnated alumina; and heating the impregnated alumina.

Another aspect of the present disclosure is directed to a composition obtained or obtainable by the method of the above aspect.

Another aspect of the present disclosure is directed to a method of manufacturing a composition comprising alumina, the alumina being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5, the method comprising: providing a solution comprising one or more salts of A, one or more salts of B and optionally one or more salts of A' and/or one or more salts of B'; contacting the solution with alumina to form a slurry; spray drying the slurry to form a spray-dried powder; and heating the spray-dried powder.

Another aspect of the present disclosure is directed to a composition obtained or obtainable by the method of the above aspect.

Another aspect of the present invention is directed to a method of manufacturing a composition comprising alumina, the alumina being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5, the method comprising: providing an aqueous solution comprising one or more salts of A, one or more salts of B and optionally one or more salts of A' and/or one or more salts of B'; contacting the solution with alumina to form a slurry; contacting the slurry with a base; recovering a solid residue from the slurry; and heating the solid residue.

Another aspect of the present disclosure is directed to a composition obtained or obtainable by the method of the above aspect.

Another aspect of the present disclosure is directed to a catalyst article comprising a substrate, the substrate having a composition of the invention disposed thereon.

The invention also encompasses an emission treatment system comprising the catalyst article described herein and a method of treating an exhaust gas, the method comprising: providing the catalyst article described herein; and contacting the catalyst article with an exhaust gas.

BRIEF DESCRIPTION OF THE DRAWINGS

FIG. 8a shows perturbated aged TWC light off performance for $NO_x$ conversions of washcoated (B18) Reference Rh (aged) fully formulated catalyst, and Rh catalysts (aged) with (B19) 10% $La_{0.9}MnO_3$—, (B20) 10% $La_{0.9}Mn_{0.7}Zr_{0.3}O_3$—, and (B21) 10% $La_{0.9}Mn_{0.9}Zr_{0.1}O_3$-modified alumina-type perovskite-modified alumina supports.

FIG. 8b shows perturbated aged TWC light off performance for CO conversions of washcoated (B18) Reference Rh (aged) fully formulated catalyst, and Rh catalysts (aged) with (B19) 10% $La_{0.9}MnO_3$—, (B20) 10% $La_{0.9}Mn_{0.7}Zr_{0.3}O_3$—, and (B21) 10% $La_{0.9}Mn_{0.9}Zr_{0.1}O_3$-modified alumina-type perovskite-modified alumina supports.

FIG. 8c shows perturbated aged TWC light off performance for TWC conversions of washcoated (B18) Reference Rh (aged) fully formulated catalyst, and Rh catalysts (aged) with (B19) 10% $La_{0.9}MnO_3$—, (B20) 10% $La_{0.9}Mn_{0.7}Zr_{0.3}O_3$—, and (B21) 10% $La_{0.9}Mn_{0.9}Zr_{0.1}O_3$-modified alumina-type perovskite-modified alumina supports.

FIG. 9a shows perturbated aged TWC light off performance for $NO_x$ conversions of washcoated (B22) Reference Pt (aged) fully formulated catalyst, and Pt catalysts (aged) with (B23) 10% $BaMnO_3$—, (B24) 20% $BaMnO_3$—, (B25) 10% $La_{0.9}MnO_3$—, (B26) 20% $La_{0.9}MnO_3$—, (B27) 10% $CaMnO_3$—, (B28) 20% $CaMnO_3$—, and (B29) 10% $LaFeO_3$-modified alumina supports.

FIG. 9b shows perturbated aged TWC light off performance for CO conversions of washcoated (B22) Reference Pt (aged) fully formulated catalyst, and Pt catalysts (aged) with (B23) 10% $BaMnO_3$—, (B24) 20% $BaMnO_3$—, (B25) 10% $La_{0.9}MnO_3$—, (B26) 20% $La_{0.9}MnO_3$—, (B27) 10% $CaMnO_3$—, (B28) 20% $CaMnO_3$—, and (B29) 10% $LaFeO_3$.modified alumina supports.

FIG. 9c shows perturbated aged TWC light off performance for THC conversions of washcoated (B22) Reference Pt (aged) fully formulated catalyst, and Pt catalysts (aged) with (B23) 10% $BaMnO_3$—, (B24) 20% $BaMnO_3$—, (B25) 10% $La_{0.9}MnO_3$—, (B26) 20% $La_{0.9}MnO_3$—, (B27) 10% $CaMnO_3$—, (B28) 20% $CaMnO_3$—, and (B29) 10% $LaFeO_3$.modified alumina supports.

FIG. 10 shows cumulative $NO_x$ emission during vehicle test of aged (B30) Reference PdRh fully formulated catalysts vs. PdRh catalysts (aged) with (B31) 10% $BaMnO_3$ (IWI)-, (B32) 10% $BaMnO_3$ (SD)-, and (B33) 20% $BaMnO_3$ (IWI)-modified alumina.

DETAILED DESCRIPTION OF THE INVENTION

Figure 1:
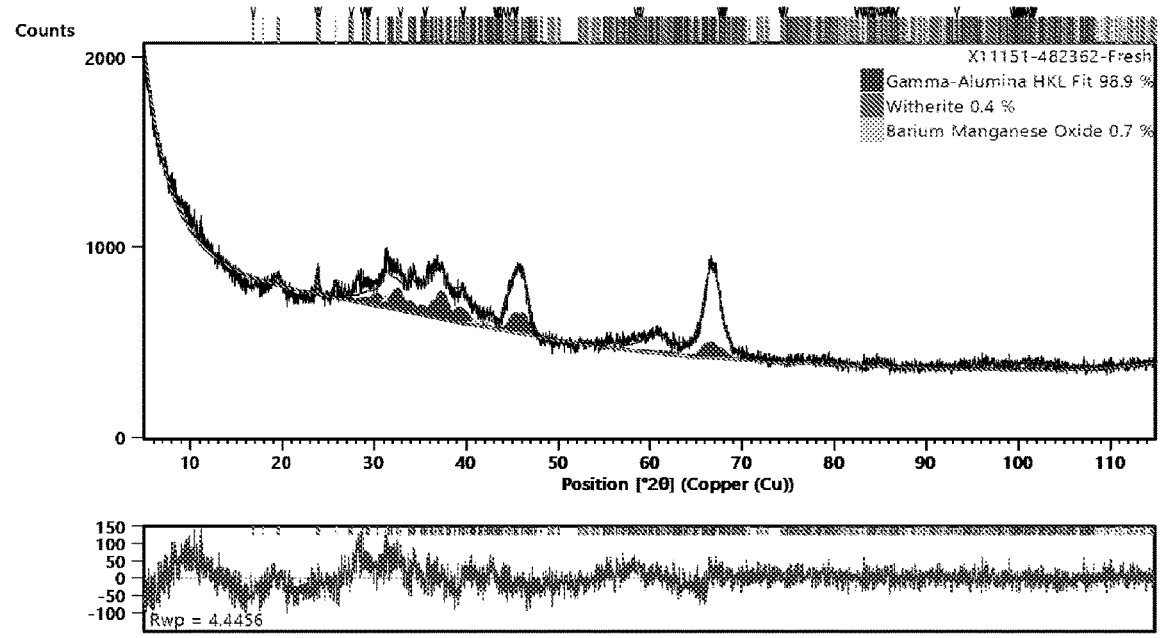
FIG. 1 shows a powder XRD pattern of 20% $BaMnO_3$ modified alumina according the Example A6.

The present invention seeks to tackle at least some of the problems associated with the prior art or at least to provide a commercially acceptable alternative solution thereto.

In a first aspect, the present invention provides a composition comprising alumina, the alumina being surface-modified with a perovskite type compound of formula (I);
wherein formula (I) is defined by $A_{x-y}A'_yB_{1-z}B'_zO_3$;
where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Alumina ($Al_2O_3$) is a "classical" support materials used in emission treatment catalysts, such as TWCs. Alumina is known to provide high surface area for active PGM metals and promoter species. It is also more thermally robust than other mixed oxide support toward harsh TWC operation conditions.

Surprisingly, the inventors of the present invention have found that surface-modifying such an alumina support with a perovskite-type compound can impart OSC properties to the alumina, which would otherwise have minimal OSC properties, while still being able to retain most of its surface area at thermal ageing conditions. This may advantageously also facilitate improved promotion of supported PGM species supported on the modified support (the composition of the invention), if present, in order to obtain improved TWC conversions.

The term "surface-modified" as used herein may encompass that the perovskite type compound is supported or coated on the alumina, for example. That is, the perovskite type compound is physically and/or chemically attached to or supported on the surface of the alumina, preferably in a (highly) dispersed form. The term "surface-modified" does not encompass merely a physical blend or mixture of the bulk perovskite type compound and alumina. The perovskite type compound is not in bulk form in this sense. For example, under extreme oxidising and/or ageing conditions, it is thought that an aluminate may form between the perovskite type compound and the alumina to help bond the perovskite type compound to the surface of the alumina. That is, an aluminate may be situated between the alumina and the perovskite type compound, such as at the interface between the alumina and the perovskite type compound. The term "surface-modified" as used herein may also encompass that the perovskite type compound has smaller particle sizes than the alumina. The term "surface-modified" as used herein may also encompass that the alumina is in bulk form, and the perovskite type compound is dispersed on the surface and/or within the pores of the bulk alumina.

Without wishing to be bound by theory, it is thought that providing such a surface-modified alumina, in which the alumina has been surface-modified with a perovskite type compound of formula (I), the perovskite compound may be stabilised by the alumina. Thus, the drawbacks of bulk perovskite type compounds, such as their low surface-area-to-volume ratio and their lack of stability at exhaust gas catalyst operating temperatures, may be mitigated, while imparting their advantageous OSC properties to the alumina support. That is, the alumina phase may act both as a support to provide high surface area and to stabilize the perovskite nanocrystalline phase (e.g. from sintering) at thermal ageing conditions. Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where alumina is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the T50 (the temperature at which 50% conversion is reached) of conversion for NOx, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs.

The term "perovskite" as used herein takes on its usual meaning in the art, i.e. a perovskite type compound may refer to the class of compounds which have a similar or distorted type of crystal structure to $CaTiO_3$.

The composition and/or perovskite type compound of formula (I) may comprise inevitable impurities, typically less than 1 wt. %, preferably less than 0.5 wt. %, more preferably less than 0.1 wt. %.

Preferably, the composition consists of alumina, the alumina being surface-modified with a perovskite type compound of formula (I).

Preferably, A and/or A' is an ion of a metal selected from the group consisting of Ca, Mg, Ba, Ca, Y, La, Sr, Nd, Ce and Gd, more preferably A and/or A' is an ion of a metal selected from the group consisting of Ca, Ba, La and Sr. Preferably, B and/or B' is an ion of a metal selected from the group consisting of Mn, Co, Fe, Zr and Ni, more preferably, B and/or B' is an ion of a metal selected from the group consisting of Mn, Zr, and Fe. Preferably, B and/or B' is doped with PGM elements comprising one or more of Pt, Pd and Rh, i.e. B and/or B' may further comprise, in addition to the preferred metals listed above, an ion of a metal selected from the group consisting of Pt, Pd and Rh. Such compositions may be particularly suitable for use in the applications described herein, for example in a TWC.

Preferably, x is from 0.8 to 1, more preferably from 0.9 to 1 or alternatively, but still preferred, from 0.7 to 0.9, more preferably from 0.8 to 0.9. Preferably, y is from 0 to 0.3, more preferably from 0 to 0.2, more preferably from greater than 0 to 0.2. Preferably, z is from 0 to 0.4, more preferably from 0 to 0.3, still more preferably from greater than 0 to 0.2. Such compositions may be particularly suitable for use in the applications described herein, for example in a TWC.

Preferably, y>0. Preferably, z>0. Such compositions may be particularly suitable for use in the applications described herein, for example in a TWC.

In an alternative preferred embodiment, z is 0. In an alternative preferred embodiment, y is 0. Preferably, y=z=0. However, z can be 0 when y>0 and y can be 0 when z>0.

Preferably, when y=z=0, A is La and B is Mn. In an alternative preferred embodiment, when y=z=0, A is Ca and B is Mn. In an alternative preferred embodiment, when y=z=0, A is La and B is Fe. In an alternative preferred embodiment, when y=z=0, A is Ba and B is Mn. In an alternative preferred embodiment, when y=z=0, A is Sr and B is Mn. In an alternative preferred embodiment, when y=z=0, A is Ba and B is Fe. In an alternative preferred embodiment, when y=z=0, A is Ca and B is Fe. In an alternative preferred embodiment, when y=z=0, A is Sr and B is Fe. Such compositions may be particularly suitable for use in the applications described herein, for example in a TWC.

Preferably, x is 1. Such compositions may be particularly suitable for use in the applications described herein, for example in a TWC.

Preferably, the alumina comprises gamma alumina. Gamma alumina is known in the art. More preferably, the alumina consists of gamma alumina. In an alternative preferred embodiment, the alumina comprises theta alumina. Theta alumina is known in the art. More preferably, the alumina consists of theta alumina. Preferably, the alumina comprises, or consists of, gamma alumina and/or theta alumina. Preferably, the alumina is doped. Suitable dopants are known in the art. For example, preferably, the alumina is doped with an oxide of one or more of La, Ba, Sr, Mg, Mn, Y, Nd, Pr, Ce, Zr, Ti, Fe, Cu, Co, Zn, Si, and Ni, more preferably La, or La and Mg. Such doped alumina may be particularly effective as a support material. Preferably, the dopant is present in the alumina in an amount of from 0.001 wt. % to 20 wt. %, and more preferably from 0.5 wt. % to 10 wt. %, based on the total weight of alumina.

Preferably, the composition comprises from 1 to 50 wt. % of the perovskite type compound, based on the total weight of the perovskite type compound and the alumina, preferably from 5 to 30 wt. %, more preferably from 5 to 25 wt. %, still more preferably from 10 to 20 wt. %. The perovskite type compound may be highly dispersed on the alumina, for example. Such a ratio of perovskite type compound may provide a particularly stable composition having improved OSC properties.

Preferably, the alumina is further surface-modified with a mixed oxide composite of formula (I). This may occur, for example, when phases other than the perovskite phase of formula (I) are present, such as due to incomplete formation of the perovskite phase during synthesis or formation of an aluminate at the boundary between the perovskite type compound and the alumina.

In a further aspect, the present invention provides a method of manufacturing a composition comprising alumina, the alumina being surface-modified with a perovskite type compound of formula (I);

wherein formula (I) is defined by $A_{x-y}A'_yB_{1-z}B'_zO_3$;
where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5, the method comprising:
providing a solution comprising an organic acid, water, one or more salts of A, one or more salts of B and optionally one or more salts of A' and/or one or more salts of B';
contacting the solution with alumina to form a slurry; and
heating the slurry.

Such a method may be considered as a (modified) Pechini method.

The term "slurry" as used herein may encompass a liquid comprising insoluble material, e.g. insoluble particles. The slurry is typically stirred, more typically for at least 10 minutes, more typically for at least 30 minutes, even more typically for at least an hour. Increased contacting and/or stirring times may increase the dispersion of the perovskite type compound on the alumina.

Contacting the solution with alumina may typically comprise adding alumina, for example in powder form, to the solution. However, contacting the solution with alumina may comprise combining the solution with a slurry comprising alumina, for example alumina powder in water. The contacting step is not particularly limited in this regard.

In some preferred embodiments, the solution further comprises an organic solvent, preferably ethylene glycol. However, more preferably, the solution does not comprise an inorganic solvent, i.e. the solution is preferably an aqueous solution.

The one or more salts preferably comprise acetate, nitrate, oxynitrate, chloride, ammonium nitrate, hydroxide, oxalate and/or citrate salts, more preferably acetate, nitrate and/or oxynitrate salts.

Preferably, heating the slurry comprises a first step of heating the slurry to a temperature of from 150 to 350° C. to form a gel. The term "gel" as used herein may encompass a colloid in a more solid form than a sol or a thick, viscous slurry, for example. Without wishing to be bound by theory, this relatively low temperature heating may facilitate the evaporation of at least some of the water in the slurry to thicken the slurry and/or the formation of the perovskite type compound on the alumina. More preferably, heating the slurry comprises a first step of heating the slurry to a temperature of from 200 to 300° C., such as from 250 to 300° C. to form a gel.

Preferably, heating the slurry comprises calcination, preferably after the heating step described above (i.e. comprising a first step of heating the slurry to a temperature of from 150 to 350° C. to form a gel). The term "calcination" as used herein may encompass a thermal treatment process in the absence of, or limited supply of, air or oxygen to bring about a thermal decomposition or change. However, typically, calcination in the present context involves heating in air in an oven. Preferably, the calcination comprises heating at a temperature of from 300 to 500° C., preferably form 350 to 450° C., for from 1 to 10 hours, preferably from 3 to 6 hours. In an alternative or additional preferred embodiment, the calcination comprises heating at a temperature of from 600 to 1000° C., preferably from 700 to 900° C. for from 1 to 8 hours, preferably from 2 to 5 hours. More preferably, the calcination comprises a first calcination step comprising heating at a temperature of from 300 to 500° C., preferably from 350 to 450° C., for from 1 to 10 hours, preferably from 3 to 6 hours, followed by a second calcination step comprising heating at a temperature of from 600 to 1000° C., preferably from 700 to 900° C., for from 1 to 8 hours, preferably from 2 to 5 hours. Without wishing to be bound by theory, it is thought that the first, lower temperature, calcination step may facilitate the formation of a mixed oxide of the perovskite-precursor metals, i.e. forming a mixed oxide from the precursor salts, and the second, higher temperature, calcination step may then facilitate the formation of a dense perovskite structure supported on the alumina (i.e. a surface-modified alumina). It is emphasized that the perovskite type compound is not in bulk form, but is supported on the surface of the alumina.

Preferably, the organic acid comprises a carboxylic acid, more preferably a di- or tri-carboxylic acid. The organic acid preferably comprises, or even consists of, citric acid, tannic acid, humic acid, succinic acid, EDTA, DTPA and/or other chelating agents, more preferably citric acid, tannic acid, humic acid, succinic acid, EDTA and/or DTPA, even more preferably citric acid.

Preferably, the composition manufactured by the method of this aspect is the composition of the first aspect described herein.

In a further aspect, the present invention provides a composition obtained or obtainable by the method of the above aspect.

Surprisingly, the inventors of the present invention have found that providing such a composition by surface-modifying an alumina support with a perovskite-type compound can impart OSC properties to the alumina, which would otherwise have minimal OSC properties, while still being able to retain most of its surface area at thermal ageing conditions. This may advantageously also facilitate improved promotion of supported PGM species supported on the modified support (the composition of the invention), if present, in order to obtain improved TWC conversions.

Without wishing to be bound by theory, it is thought that providing such a surface-modified alumina, in which the alumina has been surface-modified with a perovskite type compound of formula (I), the perovskite compound may be stabilised by the alumina. Thus, the drawbacks of bulk perovskite type compounds, such as their low surface-area-to-volume ratio and their lack of stability at exhaust gas catalyst operating temperatures, may be mitigated, while imparting their advantageous OSC properties to the alumina support. That is, the alumina phase may act both as a support to provide high surface area and to stabilize the perovskite nanocrystalline phase (e.g. from sintering) at thermal ageing conditions. Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where alumina is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the T50 (the temperature at which 50% conversion is reached) of conversion for NOx, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs. In other words, the same advantages as for the composition of the first aspect apply to the composition of this aspect.

In a further aspect, the present invention provides a method of manufacturing a composition comprising alumina, the alumina being surface-modified with a perovskite type compound of formula (I);

wherein formula (I) is defined by $A_{x-y}A'_yB_{1-z}B'_zO_3$; where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5, the method comprising:
contacting alumina with A, B, and optionally A' and/or B' using one or more salts of A, one or more salts of B and optionally one or more salts of A' and/or one or more salts of B' via incipient wetness impregnation to form an impregnated alumina; and
heating the impregnated alumina.

Incipient wetness impregnation (IW or IWI) is a well-known technique in the field. The skilled person would be able to perform an appropriate incipient wetness impregnation method without further direction.

Contacting alumina with A, B, and optionally A' and/or B' using one or more salts of A, one or more salts of B and optionally one or more salts of A' and/or one or more salts of B' via incipient wetness impregnation may comprise impregnating alumina with A, B, and optionally A' and/or B' using one or more salts of A, one or more salts of B and optionally one or more salts of A' and/or one or more salts of B' via incipient wetness impregnation, for example.

The one or more salts preferably comprise acetate, nitrate, oxynitrate, chloride, ammonium nitrate, hydroxide, oxalate and/or citrate salts, more preferably acetate, nitrate and/or oxynitrate salts.

Preferably, heating the impregnated alumina comprises a first step of drying the impregnated alumina at a temperature of from 50 to 150° C., preferably from 50 to 100° C. for from 1 hour to 24 hours, preferably 6 hours to 12 hours.

Preferably, heating the impregnated alumina comprises calcination, preferably after the heating step described above (i.e. comprising a first step of drying the impregnated alumina at a temperature of from 50 to 150° C., preferably from 50 to 100° C. for from 1 hour to 24 hours, preferably 6 hours to 12 hours). Preferably, the calcination comprises heating at a temperature of from 300 to 500° C., preferably from 350 to 450° C., for from 1 to 10 hours, preferably from 3 to 6 hours. In an alternative or additional preferred embodiment, the calcination comprises heating at a temperature of from 600 to 1000° C., preferably from 700 to 900° C. for from 1 to 8 hours, preferably from 2 to 5 hours. More preferably, the calcination comprises a first calcination step comprising heating at a temperature of from 300 to 500° C., preferably from 350 to 450° C., for from 1 to 10 hours, preferably from 3 to 6 hours, followed by a second calcination step comprising heating at a temperature of from 600 to 1000° C., preferably from 700 to 900° C., for from 1 to 8 hours, preferably from 2 to 5 hours. Without wishing to be bound by theory, it is thought that the first, lower temperature, calcination step may facilitate the formation of a mixed oxide of the perovskite-precursor metals, i.e. forming a mixed oxide from the precursor salts, and the second, higher temperature, calcination step may then facilitate the formation of a dense perovskite structure supported on the alumina (i.e. a surface-modified alumina). It is emphasized that the perovskite type compound is not in bulk form, but may be supported on the surface of the alumina in a dispersed state.

Preferably, the composition manufactured by the method of this aspect is the composition of the first aspect described herein.

In a further aspect, the present invention provides a composition obtained or obtainable by the method of the above aspect.

Surprisingly, the inventors of the present invention have found that providing such a composition by surface-modifying an alumina support with a perovskite-type compound can impart OSC properties to the alumina, which would otherwise have minimal OSC properties, while still being able to retain most of its surface area at thermal ageing conditions. This may advantageously also facilitate improved promotion of supported PGM species supported on the modified support (the composition of the invention), if present, in order to obtain improved TWC conversions.

Without wishing to be bound by theory, it is thought that providing such a surface-modified alumina, in which the alumina has been surface-modified with a perovskite type compound of formula (I), the perovskite compound may be stabilised by the alumina. Thus, the drawbacks of bulk perovskite type compounds, such as their low surface-area-to-volume ratio and their lack of stability at exhaust gas catalyst operating temperatures, may be mitigated, while imparting their advantageous OSC properties to the alumina support. That is, the alumina phase may act both as a support to provide high surface area and to stabilize the perovskite nanocrystalline phase (e.g. from sintering) at thermal ageing conditions. Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where alumina is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the T50 (the temperature at which 50% conversion is reached) of conversion for NOx, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs. In other words, the same advantages as for the composition of the first aspect apply to the composition of this aspect.

In a further aspect, the present invention provides a method of manufacturing a composition comprising alumina, the alumina being surface-modified with a perovskite type compound of formula (I);
wherein formula (I) is defined by $A_{x-y}A'_yB_{1-z}B'_zO_3$;
where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5, the method comprising:
providing a solution comprising one or more salts of A, one or more salts of B and optionally one or more salts of A' and/or one or more salts of B';
contacting the solution with alumina to form a slurry;
spray drying the slurry to form a spray-dried powder; and
heating the spray-dried powder.

Spray drying is a well-known technique in the field. The skilled person would be able to perform an appropriate spray drying method without further direction.

Contacting the solution with alumina may typically comprise adding alumina, for example in powder form, to the solution. However, contacting the solution with alumina may comprise combining the solution with a slurry comprising alumina, for example alumina powder in water. The contacting step is not particularly limited in this regard.

The one or more salts preferably comprise acetate, nitrate, oxynitrate, chloride, ammonium nitrate, hydroxide, oxalate and/or citrate salts, more preferably acetate, nitrate and/or oxynitrate salts.

Preferably, the solution is an aqueous solution.

Preferably, heating the spray-dried powder comprises calcination. Preferably, the calcination comprises heating at a temperature of from 300 to 500° C., preferably from 350 to 450° C., for from 1 to 10 hours, preferably from 3 to 6 hours. In an alternative or additional preferred embodiment, the calcination comprises heating at a temperature of from 600 to 1000° C., preferably from 700 to 900° C. for from 1 to 8 hours, preferably from 2 to 5 hours. More preferably, the calcination comprises a first calcination step comprising heating at a temperature of from 300 to 500° C., preferably from 350 to 450° C., for from 1 to 10 hours, preferably from 3 to 6 hours, followed by a second calcination step comprising heating at a temperature of from 600 to 1000° C., preferably from 700 to 900° C., for from 1 to 8 hours, preferably from 2 to 5 hours. Without wishing to be bound by theory, it is thought that the first, lower temperature, calcination step may facilitate the formation of a mixed oxide of the perovskite-precursor metals, i.e. forming a mixed oxide from the precursor salts, and the second, higher temperature, calcination step may then facilitate the formation of a dense perovskite structure supported on the alumina (i.e. a surface-modified alumina). It is emphasized that the perovskite type compound is not in bulk form, but is supported on the surface of the alumina.

Preferably, the inlet temperature of the spray drying is from 100 to 300° C., more preferably from 150 to 250° C. The inlet temperature is a well-known term within the field of spray drying.

Preferably, the composition manufactured by the method of this aspect is the composition of the first aspect described herein.

In a further aspect, the present invention provides a composition obtained or obtainable by the method of the above aspect.

Surprisingly, the inventors of the present invention have found that providing such a composition by surface-modifying an alumina support with a perovskite-type compound can impart OSC properties to the alumina, which would otherwise have minimal OSC properties, while still being able to retain most of its surface area at thermal ageing conditions. This may advantageously also facilitate improved promotion of supported PGM species supported on the modified support (the composition of the invention), if present, in order to obtain improved TWC conversions.

Without wishing to be bound by theory, it is thought that providing such a surface-modified alumina, in which the alumina has been surface-modified with a perovskite type compound of formula (I), the perovskite compound may be stabilised by the alumina. Thus, the drawbacks of bulk perovskite type compounds, such as their low surface-area-to-volume ratio and their lack of stability at exhaust gas catalyst operating temperatures, may be mitigated, while imparting their advantageous OSC properties to the alumina support. That is, the alumina phase may act both as a support to provide high surface area and to stabilize the perovskite nanocrystalline phase (e.g. from sintering) at thermal ageing conditions. Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where alumina is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the $T_{50}$ (the temperature at which 50% conversion is reached) of conversion for $NO_x$, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs. In other words, the same advantages as for the composition of the first aspect apply to the composition of this aspect.

In a further aspect, the present invention provides a method of manufacturing a composition comprising alumina, the alumina being surface-modified with a perovskite type compound of formula (I);

wherein formula (I) is defined by $A_{x-y}A'_yB_{1-z}B'_zO_3$;
where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5, the method comprising:
providing an aqueous solution comprising one or more salts of A, one or more salts of B and optionally one or more salts of A' and/or one or more salts of B';
contacting the solution with alumina to form a slurry;
contacting the slurry with a base;
recovering a solid residue from the slurry; and
heating the solid residue.

Contacting the solution with alumina may typically comprise adding alumina, for example in powder form, to the solution. However, contacting the solution with alumina may comprise combining the solution with a slurry comprising alumina, for example alumina powder in water. The contacting step is not particularly limited in this regard.

The one or more salts preferably comprise acetate, nitrate, oxynitrate, chloride, ammonium nitrate, hydroxide, oxalate and/or citrate salts, more preferably acetate, nitrate and/or oxynitrate salts.

The method comprises contacting the slurry with a base. Preferably, contacting the slurry with a base comprises contacting the slurry with a solution comprising the base, preferably an aqueous solution comprising the base. Such a method may be referred to as a "co-precipitation" method. Without wishing to be bound by theory, it is thought that the addition of the base may result in precipitation of the A, A', B and/or B' cations on the alumina support. The method may further comprise filtering and/or washing the alumina after addition of the base (i.e. with the precipitated content thereon) and prior to heating the solid residue.

Recovering a solid residue from the slurry may encompass filtering the slurry to obtain a solid residue. The term "solid residue" as used herein may encompass a filter cake, for example. Such a filter cake is well known in the art.

Preferably, heating the solid residue comprises a first step of drying the solid residue at a temperature of from 50 to 150° C., preferably from 50 to 100° C. for from 1 hour to 24 hours, preferably 6 hours to 12 hours.

Preferably, heating the solid residue comprises calcination, preferably after the heating step described above (i.e. comprising a first step of drying the solid residue at a temperature of from 50 to 150° C., preferably from 50 to 100° C. for from 1 hour to 24 hours, preferably 6 hours to 12 hours). Preferably, the calcination comprises heating at a temperature of from 300 to 500° C., preferably from 350 to 450° C., for from 1 to 10 hours, preferably from 3 to 6 hours. In an alternative or additional preferred embodiment, the calcination comprises heating at a temperature of from 600 to 1000° C., preferably from 700 to 900° C. for from 1 to 8 hours, preferably from 2 to 5 hours. More preferably, the calcination comprises a first calcination step comprising heating at a temperature of from 300 to 500° C., preferably from 350 to 450° C., for from 1 to 10 hours, preferably from 3 to 6 hours, followed by a second calcination step comprising heating at a temperature of from 600 to 1000° C., preferably from 700 to 900° C., for from 1 to 8 hours, preferably from 2 to 5 hours. Without wishing to be bound by theory, it is thought that the first, lower temperature, calcination step may facilitate the formation of a mixed oxide of the perovskite-precursor metals, i.e. forming a mixed oxide from the precursor salts, and the second, higher temperature, calcination step may then facilitate the formation of a dense perovskite structure supported on the alumina (i.e. a surface-modified alumina). It is emphasized that the perovskite type compound is not in bulk form, but may be supported on the surface of the alumina in a dispersed state.

Preferably, the base comprises ammonium hydroxide.

Preferably, recovering a solid residue from the slurry comprises filtering the slurry to obtain a solid residue and washing the solid residue with water, preferably excess water.

Preferably, the composition manufactured by the method of this aspect is the composition of the first aspect described herein.

In a further aspect, the present invention provides a composition obtained or obtainable by the method of the above aspect.

Surprisingly, the inventors of the present invention have found that providing such a composition by surface-modifying an alumina support with a perovskite-type compound can impart OSC properties to the alumina, which would otherwise have minimal OSC properties, while still being able to retain most of its surface area at thermal ageing conditions. This may advantageously also facilitate improved promotion of supported PGM species supported on the modified support (the composition of the invention), if present, in order to obtain improved TWC conversions.

Without wishing to be bound by theory, it is thought that providing such a surface-modified alumina, in which the alumina has been surface-modified with a perovskite type compound of formula (I), the perovskite compound may be stabilised by the alumina. Thus, the drawbacks of bulk perovskite type compounds, such as their low surface-area-to-volume ratio and their lack of stability at exhaust gas catalyst operating temperatures, may be mitigated, while imparting their advantageous OSC properties to the alumina support. That is, the alumina phase may act both as a support to provide high surface area and to stabilize the perovskite nanocrystalline phase (e.g. from sintering) at thermal ageing conditions. Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where alumina is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the $T_{50}$ (the temperature at which 50% conversion is reached) of conversion for $NO_x$, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs. In other words, the same advantages as for the composition of the first aspect apply to the composition of this aspect.

In a further aspect, the present invention provides a catalyst article comprising a substrate, the substrate having the composition described herein disposed thereon.

The term "catalyst article" used herein may encompass an article in which a catalyst is supported thereon or therein. The article may take the form of, for example, a honeycomb monolith, or a filter, e.g. a wall flow filter or a flow-through filter.

The term "substrate" as used herein may encompass, for example, a ceramic or metallic honeycomb, or a filter block, e.g. a wall flow filter or flow-through filter. The substrate may comprise a ceramic monolithic substrate. The substrate may vary in its material composition, size and configuration, cell shape and density, and wall thickness. Suitable substrates are known in the art.

The term "disposed thereon" in the context of this aspect may encompass both having the composition directly disposed on the substrate, i.e. with no intervening material, and/or indirectly disposed on the substrate, i.e. with intervening material. If the substrate is porous, then the term "disposed thereon" may also encompass having the composition disposed therein, for example within the pores of the substrate, i.e. wherein the composition is disposed thereon and/or therein. In other words, the composition described herein may be incorporated into one or more washcoat regions, zones or layers disposed in any order on the substrate. Such substrate-washcoat formulations, in general, are well-known in the field. The term "washcoat" as used herein is well-known in the field and refers to an adherent coating that is applied to a substrate usually during the production of a catalyst.

Preferably, the catalyst article is for treating exhaust gas. Preferably, the catalyst article comprises a three-way catalyst (TWC), more preferably the catalyst article is a TWC.

Preferably, a platinum group metal (PGM) is supported on the composition. The PGM may be supported on the surface and/or within the pores of the alumina. The PGM may also be supported on the perovskite type compound. In addition, the PGM may be located at a boundary between the alumina and the perovskite type compound supported thereon. Without wishing to be bound by theory, it is thought that the presence of the perovskite type compound may further promote the catalytic activity of the PGM as well as increasing the resistance of the PGM nanoparticles to sintering. PGM sintering may lower the catalytic activity of the PGM. These advantages may be facilitated by charge and/or oxygen transfer between the perovskite phase and the PGM phase, leading to enhanced PGM stability. For example, if the supported PGM particles have a small particle size, then it is thought that in an extreme case the particles may interact/adsorb the PGM into/onto the perovskite framework under oxidising conditions, which may reduce the likelihood of PGM sintering. The perovskite may at least facilitate the formation of a PGM oxide. The term PGM as used herein encompasses one or more platinum group metals selected from ruthenium, rhodium, palladium, osmium, iridium, and platinum. Preferably, the PGM comprises Pt, Pd, Rh, or a mixture or alloy thereof. Such metals may be particularly suitable for carrying out three-way catalysis. The PGM may be in the form of an alloy.

Preferably, the catalyst article is for use in an emission treatment system. Preferably, the catalyst article is for three-way catalysis.

Preferably, the catalyst article has a washcoat loading of from 1 $g/in^3$ to 3 $g/in^3$.

Preferably, the substrate comprises a wall flow filter substrate. In an alternative preferred embodiment, the substrate comprises a flow-through substrate.

Preferably, the catalyst article comprises a bottom layer of support material having rhodium thereon and a top layer of support material having palladium thereon. In an alternative preferred embodiment, the catalyst article comprises a bottom layer of support material having palladium thereon and a top layer of support material having rhodium thereon. The support material may comprise any suitable known support material. However, preferably, the support material comprises the composition described herein. That is, the support material present in the bottom layer and/or the top layer may comprise the composition described herein.

When present, the catalyst article preferably comprises from 2 $g/ft^3$ to 15 $g/ft^3$ rhodium, more preferably from 3 $g/ft^3$ to 10 $g/ft^3$ rhodium. When present, the catalyst article preferably comprises from 20 $g/ft^3$ to 200 $g/ft^3$ palladium, more preferably from 30 $g/ft^3$ to 150 $g/ft^3$ palladium. When present, the catalyst article preferably comprises from 2 $g/ft^3$ to 200 $g/ft^3$ platinum, preferably from 10 $g/ft^3$ to 100 $g/ft^3$ platinum.

In a further aspect, the present invention provides an emission treatment system comprising the catalyst article described herein. Preferably, the emission treatment system is for a gasoline engine. Preferably, the gasoline engine operates under stoichiometric conditions.

In a further aspect, the present invention provides a method of treating an exhaust gas, the method comprising: providing the catalyst article described herein; and contacting the catalyst article with an exhaust gas. Preferably, the exhaust gas is from a gasoline engine. Preferably, the gasoline engine operates under stoichiometric conditions.

The invention will now be described in relation to the following non-limiting examples.

A. SYNTHESIS EXAMPLES

Example A1: Synthesis of 10 wt % $BaMnO_3$ Modified Alumina by Pechini Method

1. In a 1000 mL beaker, dissolved was a calculated amount of citric acid and ethylene glycol, with molar ratio of n($M_{total}$): n(Citric Acid): n(Ethylene Glycol)=2:3:90, where $M_{total}$ is the total metal cations (Ba and Mn) in the perovskite formula.
2. Added was an appropriate amount of DI water, followed by continuous stirring to form a clear solution.
3. Added were calculated amounts of Barium Acetate (20.4 g) and Manganese Acetate Tetrahydrate (19.6 g). This was continuously stirred for 1 hr.
4. Added was the required amount of stabilized alumina (192.2 g). This was continuously stirred to mix for 1 hr.

5. The resulting slurry was slowly heated to 275° C. and continuously stirred until a gel was formed.
6. After the gel was cooled to room temperature, it was transferred to a big crucible, and covered with alumina foil (with holes on the cover).
7. Low-temperature calcination was performed in stagnant air at 400° C. for 4 hrs (ramp rate 10° C./min).
8. After the sample was cooled, it was transferred to a smaller crucible and high temperature calcination was performed at 800° C. for 4 hrs (ramp rate 10° C./min).

Example A2: Synthesis of 10 wt % BaMnO$_3$ Modified Alumina by Aqueous Method

1. In a 1000 mL beaker, dissolved was a calculated amount of citric acid in 500 mL DI water, with molar ratio of n($M_{total}$): n(Citric Acid)=2:3, where $M_{total}$ is the total metal cations (Ba and Mn) in perovskite formula. This was continuously stirred until a dense slurry was formed.
2. Added were calculated amounts of Barium Acetate (20.4 g) and Manganese Acetate Tetrahydrate (19.6 g). This was continuously stirred for 1 hr.
3. Added was the required amount of stabilized alumina (192.2 g). This was continuously stirred to mix for 1 hr.
4. The resulting slurry was heated to 275° C. and continuously stirred until a gel was formed.
5. After the gel was cooled to room temperature, it was transferred to a big crucible, and covered with alumina foil (with holes on the cover).
6. Low-temperature calcination was performed in stagnant air at 400° C. for 4 hrs (ramp rate 10° C./min).
7. After the sample was cooled, it was transferred to a smaller crucible and high temperature calcination was performed at 800° C. for 4 hrs (ramp rate 10° C./min).

Example A3: Synthesis of 10 wt % BaMnO$_3$ Modified Alumina by Incipient Wetness Impregnation Method 1. 10 wt % equivalent BaMn (1:1 molar ratio) was impregnated with a Barium Acetate (20.4 g) and Manganese Acetate Tetrahydrate (19.6 g) mixed solution on stabilized alumina (192.2 g) powder using incipient wetness impregnation.
2. The resulting impregnated alumina was dried at 80° C. for 1 hr, and mixed periodically to prevent wicking.
3. Low-temperature calcination was performed in stagnant air at 400° C. for 4 hrs, followed by high temperature calcination at 800° C. for 4 hrs (ramp rate 10° C./min).

Example A4: Synthesis of 10 wt % BaMnO$_3$ Modified Alumina by Spray Drying Method 1. A solution of Barium Acetate (107.3 g) and Manganese Acetate Tetrahydrate (102.9 g) was prepared and mixed for 1 hour until the Ba/Mn precursors were fully dissolved.
2. Stabilized alumina (1009 g) was added to the above solution, target solid content of 30%, with mechanical mixing for at least 1 hr to make a slurry.
3. The slurry was spray dried while ensuring sufficient mixing of the slurry during the whole spray drying process.
4. The spray dried powder was collected and calcined in a static oven at 400° C./4 h, followed by 800° C./4 h.

Examples A5-A19

Synthesis procedures for Example A5-A19 were similar to Examples A1-A4, with the main precursor amounts summarized in the following Table 1.

TABLE 1

Main precursor amounts for Examples A5-A19

| Ex. | Target composition (wt. %) on alumina | Synthesis method | Metal precursor A (g) | Metal precursor B (g) | Metal precursor C (g) | Stabilized alumina (g) |
|---|---|---|---|---|---|---|
| A5 | 20% BaMnO$_3$ | IWI [III] | BaAcet [a] (38.3 g) | MnAcet [b] (36.7 g) | — | 180.2 |
| A6 | 20% BaMnO$_3$ | SD [IV] | BaAcet [a] (213.3 g) | MnAcet [b] (204.7 g) | — | 1003.1 |
| A7 | 10% La$_{0.9}$MnO$_3$ | Pechini [I] | LaN [c] (34.6 g) | MnAcet [b] (21.8 g) | — | 202.6 |
| A8 | 10% La$_{0.9}$MnO$_3$ | Aqueous [II] | LaN [c] (34.6 g) | MnAcet [b] (21.8 g) | — | 202.6 |
| A9 | 10% La$_{0.9}$MnO$_3$ | IWI [III] | LaN [c] (34.6 g) | MnAcet [b] (21.8 g) | — | 202.6 |
| A10 | 10% La$_{0.9}$MnO$_3$ | SD [IV] | LaN [c] (173.2 g) | MnAcet [b] (108.9 g) | — | 1013.1 |
| A11 | 20% La$_{0.9}$MnO$_3$ | IWI [III] | LaN [c] (64.9 g) | MnAcet [b] (40.8 g) | — | 190.0 |
| A12 | 10% La$_{0.9}$Mn$_{0.7}$Zr$_{0.3}$O$_3$ | IWI [III] | LaN [c] (34.6 g) | MnAcet [b] (15.3 g) | ZrON [d] (6.2 g) | 212.3 |
| A13 | 10% La$_{0.9}$Mn$_{0.9}$Zr$_{0.1}$O$_3$ | IWI [III] | LaN [c] (34.6 g) | MnAcet [b] (19.6 g) | ZrON [d] (2.1 g) | 205.9 |
| A14 | 10% CaMnO$_3$ | IWI [III] | CaN [e] (49.6 g) | MnAcet [b] (51.5 g) | — | 300.3 |
| A15 | 20% CaMnO$_3$ | IWI [III] | CaN [e] (99.2 g) | MnAcet [b] (102.9 g) | — | 300.3 |
| A16 | 20% CaMnO$_3$ | SD [IV] | CaN [e] (330.6 g) | MnAcet [b] (343.1 g) | — | 1001.1 |
| A17 | 10% LaFeO$_3$ | IWI [III] | LaN [c] (34.6 g) | FeN [f] (32.3 g) | — | 194.2 |

TABLE 1-continued

Main precursor amounts for Examples A5-A19

| Ex. | Target composition (wt. %) on alumina | Synthesis method | Metal precursor A (g) | Metal precursor B (g) | Metal precursor C (g) | Stabilized alumina (g) |
|---|---|---|---|---|---|---|
| A18 | 20% LaFeO$_3$ | IWI [III] | LaN [c] (73.6 g) | FeN [f] (68.7 g) | — | 206.3 |
| A19 | 10% SrMnO$_3$ | Pechini [I] | SrN [g] (22.2 g) | MnAcet [b] (25.7 g) | — | 200.1 |

Notes:
[I.] Synthesis procedure similar to Example A1 (Pechini method), with different amounts of metal precursors and alumina
[II.] Synthesis procedure similar to Example A2 (Aqueous method), with different amounts of metal precursors and alumina.
[III.] Synthesis procedure similar to Example A3 (Incipient wetness impregnation method, IWI), with different amounts of metal precursors and alumina.
[IV.] Synthesis procedure similar to Example A4 (Spray drying method, SD), with different amounts of metal precursors and alumina.
[a.] Barium acetate.
[b.] Manganese Acetate tetrahydrate.
[c.] Lanthanum nitrate hexahydrate.
[d.] Zirconium oxynitrate (in solution form).
[e.] Calcium nitrate tetrahydrate.
[f.] Iron nitrate nonahydrate.
[g.] Strontium nitrate.

B. Catalyst Preparation Examples

Reference Example B1: 3 wt % Pd/Alumina Washcoated Catalyst 1. 3 wt % Pd (as Palladium nitrate solution) was impregnated on alumina powder using incipient wetness impregnation.
2. The impregnated alumina was dried at 80° C. for 1 hr, and mixed periodically to prevent wicking, before calcining at 500° C. for 30 min in static air.
3. A slurry was prepared with DI water, and appropriate amount of binder and thickening agent for a final batch solid of 22%. The slurry was mixed vigorously with VWR vortex mixer until homogeneous.
4. 1×3 inch ceramic substrate cores were coated targeting 1.2 inch dose from the inlet end, then dried with air cure.
5. The brick was fired at 500° C. for 30 min in a static oven.

Example B2: 3 wt % Pd/10% BMO Modified Alumina Washcoated Catalyst 1. 3 wt % Pd (as Palladium nitrate solution) was impregnated on 10% BaMnO$_3$ modified alumina powder (Example A1) using incipient wetness impregnation.
2. The impregnated alumina was dried at 80° C. for 1 hr, and mixed periodically to prevent wicking, before calcining at 500° C. for 30 min in static air
3. A slurry was prepared with DI water, and appropriate amount of binder and thickening agent for a final batch solid of 22%. The slurry was mixed vigorously with VWR vortex mixer till homogeneous.
4. 1×3 inch ceramic substrate cores were coated targeting 1.2 inch dose from the inlet end, then dried with air cure.
5. The brick was fired at 500° C. for 30 min in a static oven.

Examples B3-B9

Catalyst preparation procedures for Examples B3-B14 were similar to Examples B1 and B2, with the main precursor amounts summarized in the following Table 2.

TABLE 2

Main precursor amount for Examples B3- B9

| Example | PGM and loading wt % | Support material (modified alumina) |
|---|---|---|
| B3 | 3% Pd | (A7) 10% La$_{0.9}$MnO$_3$ modified alumina |
| B4 | 3% Pd | (A19) 10% SrMnO$_3$ modified alumina |
| B5 (reference) | 0.3% Rh | Stabilized alumina |
| B6 | 0.3% Rh | (A3) 10% BaMnO$_3$ modified alumina |
| B7 | 0.3% Rh | (A9) 10% La$_{0.9}$MnO$_3$ modified alumina |
| B8 | 0.3% Rh | (A12) 10% La$_{0.9}$Mn$_{0.7}$Zr$_{0.3}$O$_3$ modified alumina |
| B9 | 0.3% Rh | (A13) 10% La$_{0.9}$Mn$_{0.9}$Zr$_{0.1}$O$_3$ modified alumina |

Reference Example B10: Fully Formulated Single Layer Pd Washcoat

1. A solution was prepared with the required amount of Pd nitrate (with Pd loading 100 g/ft$^3$).
2. Added were 1 g/in$^3$ of stabilized alumina powder, and 1 g/in$^3$ of CZO material, before mixing for 1 hr.
3. Added was 300 g/ft$^3$ of Barium sulfate, before mixing for at least 1 hr.
4. Added was an appropriate amount of binder before mixing for 1 hr.
5. Solids were adjusted to 30%, thickening agent was added and before mixing overnight.
6. 50-55% from the inlet end of a 1×3 inch ceramic substrate core was coated, dried with air cure, then coated 50-55% dose length from the outlet end.
7. The brick was fired at 500° C. for 30 min in a static oven.

Example B11: Fully Formulated Single Layer Pd Washcoat with 10% BMO Modified Alumina 1. A solution was prepared with the required amount of Pd nitrate (with Pd loading 100 g/ft$^3$).
2. Added was 1 g/in$^3$ of 10% BaMnO$_3$ modified alumina powder (Example A3), and 1 g/in$^3$ of CZO material, before mixing for 1 hr.

3. Added was 300 g/ft³ of Barium sulfate, before mixing for at least 1 hr.
4. Added was an appropriate amount of binder before mixing for 1 hr.
5. Solids were adjusted to 30%, thickening agent was added before mixing overnight.
6. 50-55% from the inlet end of a 1×3 inch ceramic substrate core was coated, dried with air cure, then coated 50-55% dose length from the outlet end.
7. The brick was fired at 500° C. for 30 min in a static oven.

Examples B12-B17

Catalyst preparation procedures for Examples B12-B17 are similar to Examples B10 and B11, with Pd loading and type of modified alumina listed in the following Table 3.

TABLE 3

Pd loading and types of modified alumina for Examples B12- B17

| Example | Pd loading (g/ft³) | Support material |
|---|---|---|
| B12 | 100 | (A5) 20% $BaMnO_3$ modified alumina |
| B13 | 100 | (A11) 20% $La_{0.9}MnO3$ modified alumina |
| B14 | 100 | (A12) 10% $La_{0.9}Mn_{0.7}Zr_{0.3}O_3$ modified alumina |
| B15 | 100 | (A13) 10% $La_{0.9}Mn_{0.9}Zr_{0.1}O_3$ modified alumina |
| B16 | 100 | (A17) 10% $LaFeO_3$ modified alumina |
| B17 (reference) | 130 | Stabilized alumina |

Reference Example B18: Fully Formulated Single Layer Rh Washcoat

1. A solution was prepared with the required amount of Rh nitrate (with Rh loading 4.8 g/ft³).
2. A slurry of unmilled stabilized alumina (0.5 g/in³) was prepared, and mixed until homogeneous (at least 30 min).
3. Ammonium was added dropwise until pH 7.0-7.5 was reached.
4. The slurry was mixed for 1 hr so the Rhodium was precipitated throughout the washcoat.
5. Added was milled stabilized alumina (0.1 g/in³) and CZO (0.7 g/in³) before mixing for 30 minutes until homogeneous.
6. An appropriate amount of binder was added before mixing for 30 minutes, and solids were adjusted to 23%.
7. Added was thickening agent targeting ~1.0-1.2 wt % water based, before mixing overnight.
8. 50-55% from the inlet end of a 1×3 inch ceramic substrate core was coated, dried with air cure, then 50-55% dose length from the outlet end was coated.
9. The brick was fired at 500° C. for 30 min in a static oven.

Example B19: Fully Formulated Single Layer Rh Washcoat with 10% LMO Modified Alumina 1. A solution was prepared with the required amount of Rh nitrate (with Rh loading 4.8 g/ft³).
2. A slurry of unmilled 10% $La_{0.9}MnO_3$ modified alumina was prepared (Example A9, 0.5 g/in³), and mixed until homogeneous (at least 30 min).
3. Ammonium was added dropwise until pH 7.0-7.5 was reached.
4. The slurry was mixed for 1 hr so the Rhodium precipitated throughout the washcoat.
5. Added was milled stabilized alumina (0.1 g/in³) and CZO (0.7 g/in³) before mixing for 30 minutes until homogeneous.
6. An appropriate amount of binder was added before mixing for 30 minutes, and solids were adjusted to 23%.
7. Added was thickening agent targeting ~1.0-1.2 wt % water based, before mixing overnight.
8. 50-55% from the inlet end of a 1×3 inch ceramic substrate core was coated, dried with air cure, then 50-55% dose length from the outlet end was coated.
9. The brick was fired at 500° C. for 30 min in a static oven.

Examples B20 and B21

Catalyst preparation procedures for Examples B20 and B21 are similar to Examples B18 and B19, with Rh loading and type of modified alumina listed in the following Table 4.

TABLE 4

Rh loading and types of modified alumina for Examples B20 and B21

| Example | Rh loading (g/ft³) | Support material (modified alumina) |
|---|---|---|
| B20 | 4.8 | (A12) 10% $La_{0.9}Mn_{0.7}Zr_{0.3}O_3$ modified alumina |
| B21 | 4.8 | (A13) 10% $La_{0.9}Mn_{0.9}Zr_{0.1}O_3$ modified alumina |

Reference Example B22: Fully Formulated Single Layer Pt Washcoat

1. A solution was prepared with the required amount of Pt nitrate (with Pt loading 20 g/ft³).
2. Stabilized alumina (1 g/in³) and CZO (1 g/in³) were added to the batch.
3. pH was adjusted to 5-6.6 with ammonia, and mixed for at least 1 hour.
4. Solids were adjusted to target (suggest ~30%).
5. An appropriate amount of thickening agent was added before mixing overnight.
6. A single dose target 1.2 inch from the inlet end of a 1×3 inch ceramic substrate core was coated.
7. Fire the brick at 500° C./30 min in a static oven.

Example B23: Fully Formulated Single Layer Pt Washcoat with 10% BMO Modified Alumina 1. A solution was prepared with the required amount of Pt nitrate (with Pt loading 20 g/ft$^3$).
2. 10% BaMnO$_3$ modified alumina (A3, 1 g/in$^3$) and CZO (1 g/in$^3$) were added to the batch.
3. pH was adjusted to 5-6.6 with ammonia, and mixed for at least 1 hour.
4. Solids were adjusted to target (suggest ~30%).
5. An appropriate amount of thickening agent was added before overnight.
6. A single dose target 1.2 inch from the inlet end of a 1×3 inch ceramic substrate core was coated.
7. The brick was fired at 500° C./30 min in a static oven.

Examples B24-B29

Catalyst preparation procedures for Examples B24-B29 are similar to Examples B22 and B23, with Pt loading and type of modified alumina listed in the following Table 5.

TABLE 5

Pt loading and types of modified alumina for Examples B24-B29

| Example | Pt loading (g/ft$^3$) | Support material (modified alumina) |
|---|---|---|
| B24 | 20 | (A5) 20% BaMnO$_3$ modified alumina |
| B25 | 20 | (A9) 10% La$_{0.9}$MnO$_3$ modified alumina |
| B26 | 20 | (A11) 20% La$_{0.9}$MnO$_3$ modified alumina |
| B27 | 20 | (A14) 10% CaMnO$_3$ modified alumina |
| B28 | 20 | (A15) 20% CaMnO$_3$ modified alumina |
| B29 | 20 | (A17) 10% LaFeO$_3$ modified alumina |

Reference Example B30: Fully Formulated Double Layer PdRh Washcoat

Bottom Layer:
1. A solution of the required amount of Pd nitrate (with Pd loading 80 g/ft$^3$) was prepared.
2. A slurry of unmilled stabilized alumina (1 g/in$^3$) and milled CZO (0.5 g/in$^3$) was added, before mixing for at least 2 hr.
3. Barium acetate (with Ba of 250 g/ft$^3$) was added, before mixing for 1 hr.
4. The slurry was de-agglomerated for 5 min at 4000-5000 rpm.
5. A thickening agent was added with 0.3-0.6% of total water, before mixing overnight
6. 50-55% from the inlet end of a 1×3 inch ceramic substrate core was coated, dried with air cure, then 50-55% dose length from the outlet end was coated.
7. The brick was fired at 500° C./30 min in a static oven.

Top Layer:
1. A solution of the required amount of Rh nitrate (with Rh loading 3.8 g/ft$^3$) was prepared.
2. A slurry of milled stabilized alumina (0.8 g/in$^3$) was added, before mixing for at least 1 hr.
3. NH$_4$OH was added to a pH of 6-7 and mixed for at least 1 hr.
4. A slurry of milled CZO (0.8 g/in$^3$) was added, before mixing for at least 1 hr.
5. Thickening agent was added and stirred overnight
6. 50-55% from the inlet end of a 1×3 inch ceramic substrate core was coated, dried with air cure, then 50-55% dose length from the outlet end was coated.
7. The brick was fired at 500° C./30 min in a static oven.

Examples B31-B33

Catalyst preparation procedures for Examples B31-B33 are similar to Example B30, with same top layer formulation, and different bottom layer formulation by replacing unmodified alumina with modified alumina, as listed in the following Table 6.

TABLE 6

Types of modified alumina in bottom layer for Examples B31-B33

| Example | Layer | Support material (modified alumina) |
|---|---|---|
| 31 | Bottom | (A3) 10% BaMnO$_3$ modified alumina |
| 32 | Bottom | (A4) 10% BaMnO$_3$ modified alumina |
| 33 | Bottom | (A5) 20% BaMnO$_3$ modified alumina |

C. Results and Testing

FIG. 1 shows a powder XRD pattern of 20% BaMnO$_3$ modified alumina according the Example A6. A hexagonal polytype of the BaMnO$_3$ perovskite structure was detected. In general, due to the high surface area of alumina (around 200 m$^2$/g) and relatively low loading of perovskite (10% to 20%) synthesized on the alumina, the perovskite phase is usually highly dispersed and sometimes below the detection limit of XRD.

Figure 2:
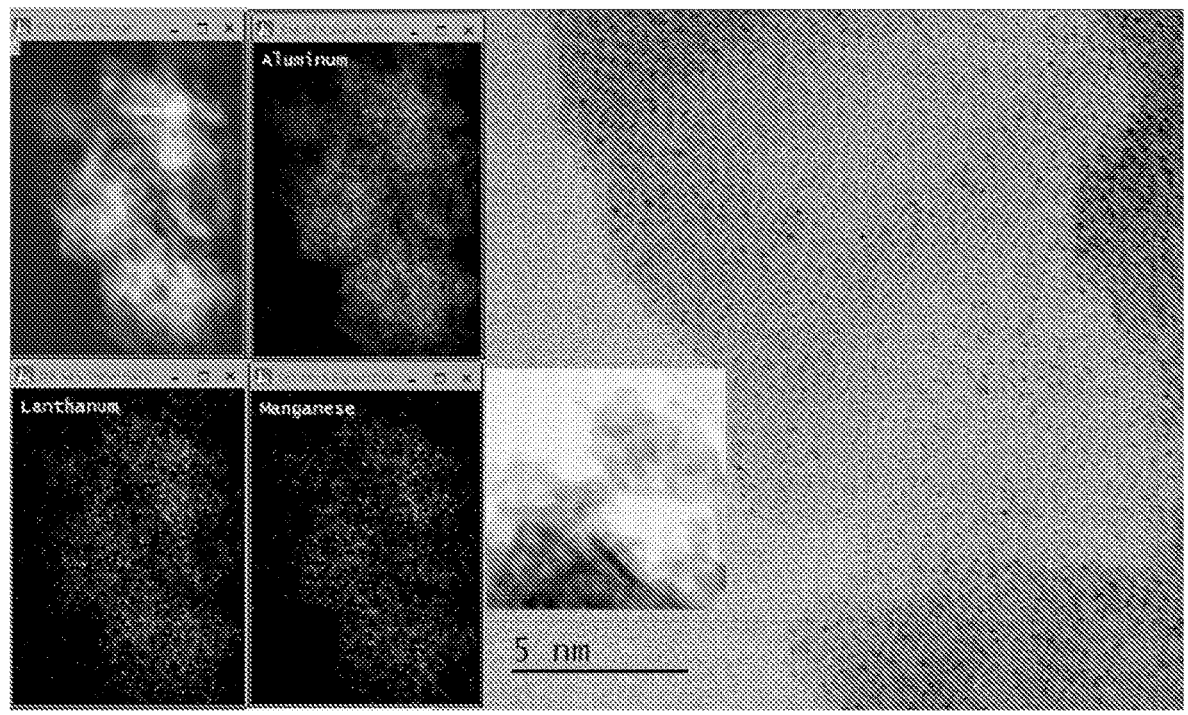
FIG. 2 shows the selected STEM elemental mapping and images of 20% $La_{0.9}MnO_3$ modified alumina according to Example A11.
Figure 3:
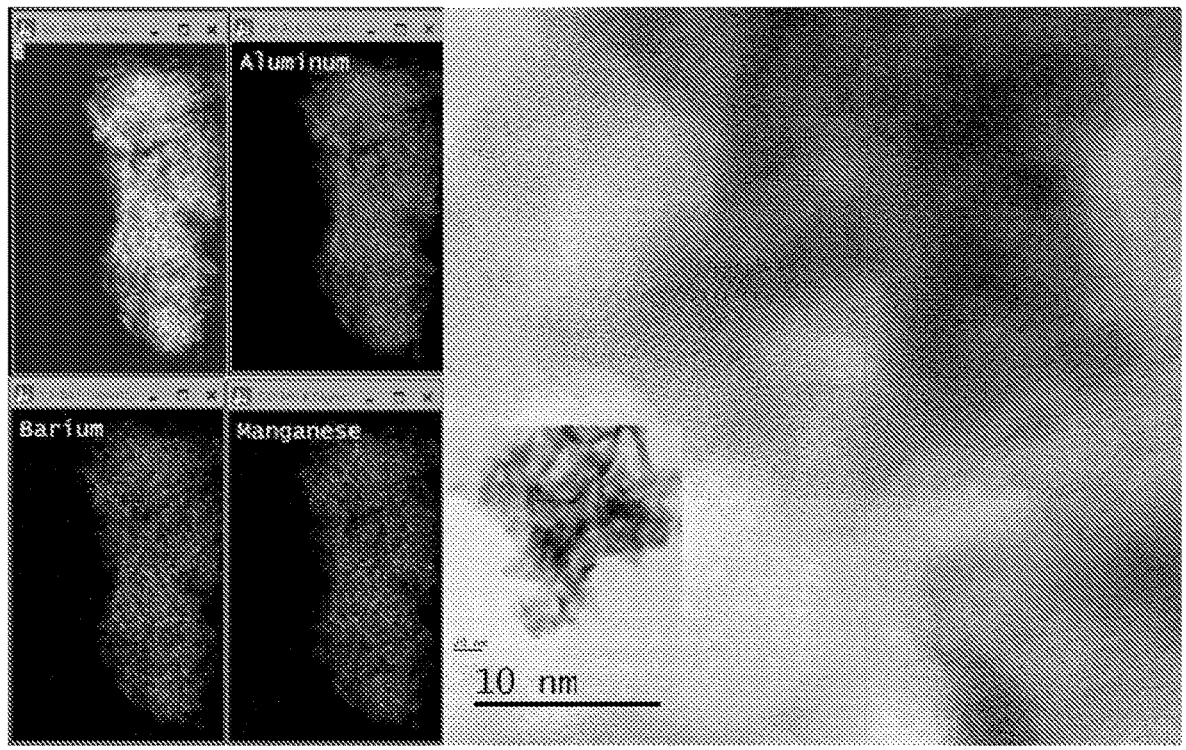
FIG. 3 shows the selected STEM elemental mapping and images of 20% $BaMnO_3$ modified alumina according to Example A6.

FIG. 2 and FIG. 3, respectively, show the selected STEM elemental mapping and images of (A11) 20% La$_{0.9}$MnO$_3$ modified alumina and (A6) 20% BaMnO$_3$ modified alumina. Universal dispersion of perovskite A site and B site elements on alumina support were observed with both samples. High resolution STEM images also showed lattice spacings at particle surfaces/edges, suggesting formation or ordered crystallite structures on the alumina support.

Figure 4:
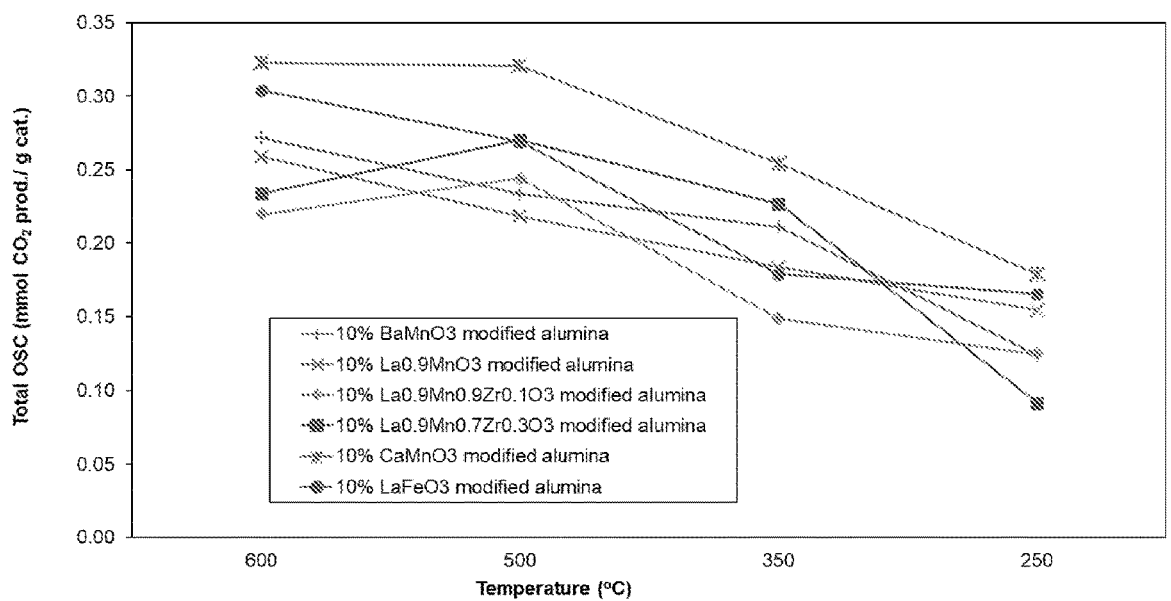
FIG. 4 shows OSC of selected perovskite-modified alumina samples.

FIG. 4 shows OSC of selected perovskite-modified alumina samples. The alumina support originally exhibits no OSC property. After surface modification with the perovskite phases, pronounced OSC function is introduced to the alumina support. During the OSC measurement, a powder sample was pre-oxidized at each temperature, and CO was subsequently flowed through the sample, when CO was converted to CO$_2$ by the oxygen species donated from the powder sample. The total OSC of the solid sample is therefore corresponds to the amount of CO$_2$ produced per gram of sample. Low temperature (≤350° C.) OSC of these modified alumina samples reached as high as 0.1 to 0.2 mmol CO$_2$ prod./g, while high temperature (>500° C.) OSC of these samples reached as high as 0.2 to 0.35 mmol CO$_2$ prod./g.

Figure 5A:
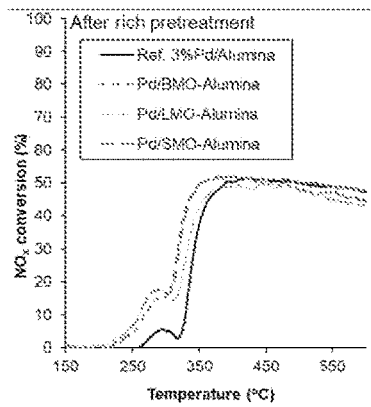
FIG. 5a shows perturbated aged TWC light off performance for NOx conversions of washcoated (B1) Reference Pd catalyst (aged) on single alumina support, and Pd catalysts (aged) on (B2) $BaMnO_3$—, (B3) $La_{0.9}MnO_3$—, and (B4) $SrMnO_3$-type perovskite-modified alumina supports.
Figure 5B:
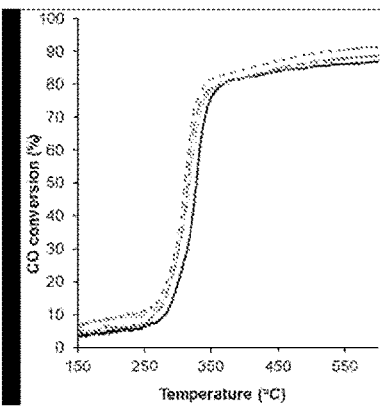
FIG. 5b shows perturbated aged TWC light off performance for CO conversions of washcoated (B1) Reference Pd catalyst (aged) on single alumina support, and Pd catalysts (aged) on (B2) $BaMnO_3$—, (B3) $La_{0.9}MnO_3$—, and (B4) $SrMnO_3$-type perovskite-modified alumina supports.
Figure 5C:
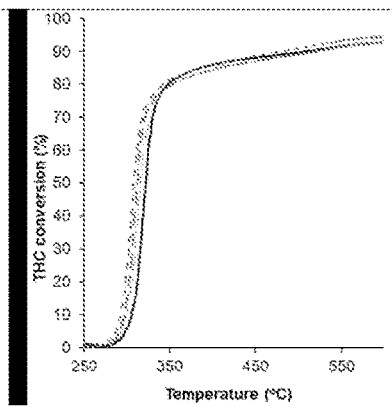
FIG. 5c shows perturbated aged TWC light off performance for THC conversions of washcoated (B1) Reference Pd catalyst (aged) on single alumina support, and Pd catalysts (aged) on (B2) $BaMnO_3$—, (B3) $La_{0.9}MnO_3$—, and (B4) $SrMnO_3$-type perovskite-modified alumina supports.

FIG. 5a, FIG. 5b and FIG. 5c, respectively, show TWC light off performance (NO$_x$ conversion, CO conversion and THC conversion) of single alumina or modified alumina supported Pd catalysts. In particular, the figures show perturbated aged TWC light off performance for (a) NO, (b) CO, and (c) THC conversions of washcoated (B1) Reference Pd catalyst (aged) on single alumina support, and Pd catalysts (aged) on (B2) BaMnO$_3$—, (B3) La$_{0.9}$MnO$_3$—, and (B4) SrMnO$_3$-type perovskite-modified alumina support. Reaction condition: with rich pre-treatment, 150-700° C., λ=0.96-1.04, GHSV=200,000 hr$^{-1}$. The modified supports were synthesized via Pechini method. Compared to the reference catalyst, improvements in TWC conversions were shown with perovskite-modified supports, especially with $NO_x$ conversion.

Figure 6A:
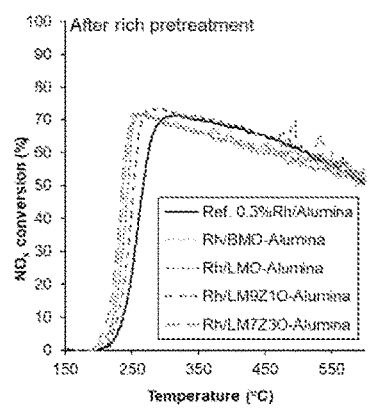
FIG. 6a shows perturbated aged TWC light off performance for $NO_x$ conversions of washcoated (B5) reference Rh catalyst (aged) on single alumina support, and Rh catalysts (aged) on (B6) $BaMnO_3$—, (B7) $La_{0.9}MnO_3$—, (B8) $La_{0.9}Mn_{0.7}Zr_{0.3}O_3$—, and (B9) $La_{0.9}Mn_{0.9}Zr_{0.1}O_3$-type perovskite-modified alumina supports.
Figure 6B:
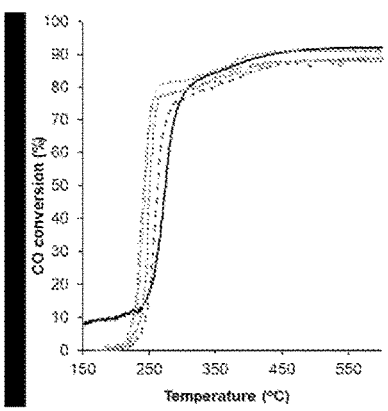
FIG. 6b shows perturbated aged TWC light off performance for CO conversions of washcoated (B5) reference Rh catalyst (aged) on single alumina support, and Rh catalysts (aged) on (B6) $BaMnO_3$—, (B7) $La_{0.9}MnO_3$—, (B8) $La_{0.9}Mn_{0.7}Zr_{0.3}O_3$—, and (B9) $La_{0.9}Mn_{0.9}Zr_{0.1}O_3$-type perovskite-modified alumina supports.
Figure 6C:
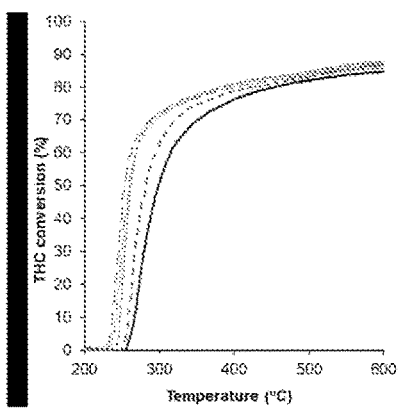
FIG. 6c shows perturbated aged TWC light off performance for THC conversions of washcoated (B5) reference Rh catalyst (aged) on single alumina support, and Rh catalysts (aged) on (B6) $BaMnO_3$—, (B7) $La_{0.9}MnO_3$—, (B8) $La_{0.9}Mn_{0.7}Zr_{0.3}O_3$—, and (B9) $La_{0.9}Mn_{0.9}Zr_{0.1}O_3$-type perovskite-modified alumina supports.

FIG. 6a, FIG. 6b and FIG. 6c, respectively, show TWC light off performance ($NO_x$ conversion, CO conversion and THC conversion) of single alumina or modified alumina supported Rh catalysts. In particular, the figures show perturbated aged TWC light off performance for (a) NO, (b) CO, and (c) THC conversions of washcoated (B5) reference Rh catalyst (aged) on single alumina support, and Rh catalysts (aged) on (B6) $BaMnO_3$—, (B7) $La_{0.9}MnO_3$—, (B8) $La_{0.9}Mn_{0.7}Zr_{0.3}O_3$—, and (B9) $La_{0.9}Mn_{0.9}Zr_{0.1}O_3$-type perovskite-modified alumina support. Reaction condition: with rich pre-treatment, 150-700° C., $\lambda$=0.96~1.04, GHSV=200,000 $hr^{-1}$. The modified supports were synthesized via incipient wetness impregnation method. Compared to the reference catalyst, pronounced improvements in TWC conversions were shown with perovskites-modified supports.

Figure 7A:
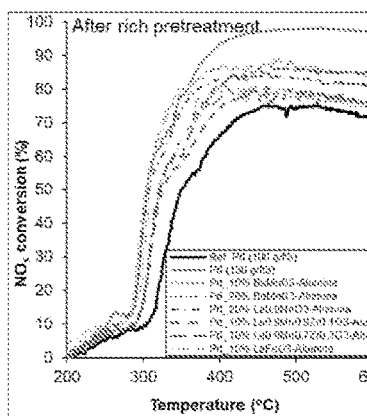
FIG. 7a shows perturbated aged TWC light off performance for $NO_x$ conversions of washcoated (B10) Reference Pd fully formulated catalyst (aged), and Pd catalysts (aged) with (B11) 10% $BaMnO_3$—, (B12) 20% $BaMnO_3$—, (B13) 20% $La_{0.9}MnO_3$—, (B14) 10% $La_{0.9}Mn_{0.7}Zr_{0.3}O_3$—, (B15) 10% $La_{0.9}Mn_{0.9}Zr_{0.1}O_3$—, and (B16) 10% $LaFeO_3$-modified alumina-type perovskite-modified alumina supports, and (B17) Reference Pd catalyst with 130 g/ft$^3$ Pd loading.
Figure 7B:
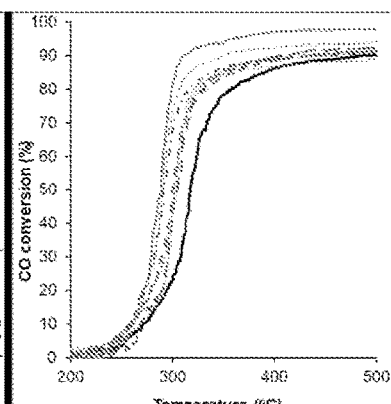
FIG. 7b shows perturbated aged TWC light off performance for CO conversions of washcoated (B10) Reference Pd fully formulated catalyst (aged), and Pd catalysts (aged) with (B11) 10% $BaMnO_3$—, (B12) 20% $BaMnO_3$—, (B13) 20% $La_{0.9}MnO_3$—, (B14) 10% $La_{0.9}Mn_{0.7}Zr_{0.3}O_3$—, (B15) 10% $La_{0.9}Mn_{0.9}Zr_{0.1}O_3$—, and (B16) 10% $LaFeO_3$-modified alumina-type perovskite-modified alumina supports, and (B17) Reference Pd catalyst with 130 g/ft$^3$ Pd loading.
Figure 7C:
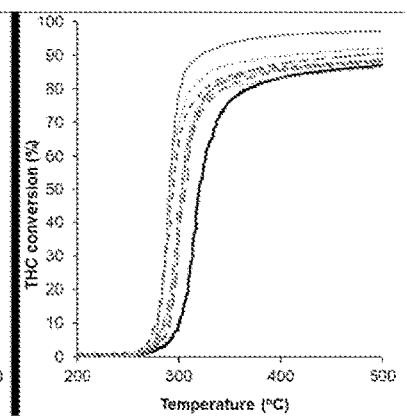
FIG. 7c shows perturbated aged TWC light off performance for THC conversions of washcoated (B10) Reference Pd fully formulated catalyst (aged), and Pd catalysts (aged) with (Bib) 10% $BaMnO_3$—, (B12) 20% $BaMnO_3$—, (B13) 20% $La_{0.9}MnO_3$—, (B14) 10% $La_{0.9}Mn_{0.7}Zr_{0.3}O_3$—, (B15) 10% $La_{0.9}Mn_{0.9}Zr_{0.1}O_3$—, and (B16) 10% $LaFeO_3$-modified alumina-type perovskite-modified alumina supports, and (B17) Reference Pd catalyst with 130 g/ft$^3$ Pd loading.

FIG. 7a, FIG. 7b and FIG. 7c, respectively, show TWC light off performance ($NO_x$ conversion, CO conversion and THC conversion) of fully formulated Pd catalysts with perovskite-modified supports. In particular, the figures show perturbated aged TWC light off performance for (a) NO, (b) CO, and (c) THC conversions of washcoated (B10) Reference Pd fully formulated catalyst (aged), and Pd catalysts (aged) with (B11) 10% $BaMnO_3$—, (B12) 20% $BaMnO_3$—, (B13) 20% $La_{0.9}MnO_3$—, (B14) 10% $La_{0.9}Mn_{0.7}Zr_{0.3}O_3$—, (B15) 10% $La_{0.9}Mn_{0.9}Zr_{0.1}O_3$—, and (B16) 10% $LaFeO_3$-modified alumina-type perovskite-modified alumina support, and (B17) Reference Pd catalyst with 130 g/ft³ Pd loading. Reaction condition: with rich pre-treatment, 150-700° C., $\lambda$=0.96-1.04, GHSV=200,000 $hr^{-1}$. Compared to the reference Pd (100 g/ft³ Pd loading), significant improvements in TWC conversions were shown with perovskite-modified supports. The T50s (temperature at which 50% conversion is reached) and 775s (temperature at which 50% conversion is reached) of catalysts with some perovskite-alumina compositions were even comparable with that of Pd catalyst at 130 g/ft³ loading. The order of overall TWC activity follows the order of Pd catalyst with 20% $BaMnO_3$-alumina>20% $La_{0.9}MnO_3$-alumina>10% $LaFeO_3$-alumina>10% $BaMnO_3$-alumina>10% $La_{0.9}Mn_{0.9}Zr_{0.1}O_3$-alumina>10% $La_{0.9}Mn_{0.7}Zr_{0.3}O_3$-alumina> Reference Pd (at 100 g/ft³). FIG. 8a, FIG. 8b and FIG. 8c, respectively, show TWC light off performance ($NO_x$ conversion, CO conversion and THC conversion) of fully formulated Rh catalysts with perovskite-modified supports. In particular, the figures show perturbated aged TWC light off performance for (a) NO, (b) CO, and (c) THC conversions of washcoated (B18) Reference Rh (aged) fully formulated catalyst, and Rh catalysts (aged) with (B19) 10% $La_{0.9}MnO_3$—, (B20) 10% $La_{0.9}Mn_{0.7}Zr_{0.3}O_3$—, and (B21) 10% $La_{0.9}Mn_{0.9}Zr_{0.1}O_3$-modified alumina-type perovskite-modified alumina support. Reaction condition: with rich pre-treatment, 150-700° C., $\lambda$=0.96~1.04, GHSV=200,000 $hr^{-1}$. Compared to the reference Rh catalyst, significant improvements in TWC conversions were shown with selected perovskite-modified supports.

FIG. 9a, FIG. 9b and FIG. 9c, respectively, show TWC light off performance of fully formulated Pt catalysts with perovskite-modified supports. In particular, the figures show perturbated aged TWC light off performance for (a) NO, (b) CO, and (c) THC conversions of washcoated (B22) Reference Pt (aged) fully formulated catalyst, and Pt catalysts (aged) with (B23) 10% $BaMnO_3$—, (B24) 20% $BaMnO_3$—, (B25) 10% $La_{0.9}MnO_3$—, (B26) 20% $La_{0.9}MnO_3$—, (B27) 10% $CaMnO_3$—, (B28) 20% $CaMnO_3$—, and (B29) 10% $LaFeO_3$.modified alumina support. Reaction condition: with rich pre-treatment, 150-700° C., $\lambda$=0.96-1.04, GHSV=200,000 $hr^{-1}$. Compared to the Reference Pt catalyst, significant improvements in TWC conversions were shown with selected perovskite-modified supports, following the order of: Pt with 10% $CaMnO_3$-alumina>20% $CaMnO_3$-alumina>20% $BaMnO_3$-alumina>20% $La_{0.9}MnO_3$-alumina>10% $La_{0.9}MnO_3$-alumina>10% $BaMnO_3$-alumina>10% $LaFeO_3$-alumina>Reference Pt.

FIG. 10 shows cumulative $NO_x$ emission of fully formulated Pd—Rh catalysts with perovskite-modified supports. In particular, FIG. 10 shows cumulative $NO_x$ emission during vehicle test of aged (B30) Reference PdRh fully formulated catalysts vs. PdRh catalysts (aged) with (B31) 10% $BaMnO_3$ (IWI)-, (B32) 10% $BaMnO_3$ (SD)-, and (B33) 20% $BaMnO_3$ (IWI)-modified alumina. Compared to the Reference Pd—Rh catalyst, significant improvements in NOx conversion was shown with selected perovskite-modified supports.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A composition comprising alumina, the alumina being surface-modified with a perovskite type compound of formula (I);
   wherein formula (I) is defined by $A_{x-y}A'_yB_{1-z}B'_zO_3$;
   where:
   A is an ion of a metal selected from the group consisting of Li, Na, K, Cs, Mg, Sr, Ba, Ca, Y, La, Ce, Pr, Nd, and Gd;
   A' is an ion of a metal selected from the group consisting of Li, Na, K, Cs, Mg, Sr, Ba, Ca, Y, La, Ce, Pr, Nd, and Gd;
   B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
   B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
   x is from 0.7 to 1;
   y is from 0 to 0.5; and
   z is from 0 to 0.5;
   wherein the composition comprises from 1 to 50 wt. % of the perovskite type compound, based on the total weight of the perovskite type compound and the alumina.

2. The composition of claim 1, wherein A and/or A' is an ion of a metal selected from the group consisting of Ca, Ba, La and Sr.

3. The composition of claim 1, wherein B and/or B' is an ion of a metal selected from the group consisting of Mn, Zr, and Fe.

4. The composition of claim 1, wherein x is from 0.8 to 1.

5. The composition of claim 1, wherein y is from 0 to 0.3.

6. The composition of claim 1, wherein z is from 0 to 0.4.

7. The composition of claim 1, wherein the alumina is doped.

8. The composition of claim 7, wherein the alumina is doped with an oxide of one or more of La, Ba, Sr, Mg, Mn, Y, Nd, Pr, Ce, Zr, Ti, Fe, Cu, Co, Zn, Si and Ni.

9. The composition of claim 1, wherein the composition comprises from 5 to 30 wt. % of the perovskite type compound, based on the total weight of the perovskite type compound and the alumina.

10. A catalyst article comprising a substrate, wherein the substrate having the composition according to claim 1 disposed thereon.

11. The catalyst article of claim 10, wherein the catalyst article is for treating exhaust gas.

12. The catalyst article of claim 10, wherein the catalyst article comprises a three-way catalyst (TWC).

13. The catalyst article of claim 10, wherein a platinum group metal (PGM) is supported on the composition.

14. The catalyst article of claim 13, wherein the PGM comprises Pt, Pd, Rh, or a mixture or alloy thereof.

15. The catalyst article of claim 10, having a washcoat loading of from 1 g/in$^3$ to 3 g/in$^3$.

16. The catalyst article of claim 10, wherein the substrate comprises a wall-flow filter substrate.

17. The catalyst article of claim 10, wherein the substrate comprises a flow-through substrate.

18. A method of manufacturing a composition comprising alumina, the alumina being surface-modified with a perovskite type compound of formula (I);
wherein formula (I) is defined by $A_{x-y}A'_yB_{1-z}B'_zO_3$; where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5, the method comprising:
providing a solution comprising an organic acid, water, one or more salts of A, one or more salts of B and optionally one or more salts of A' and/or one or more salts of B';
contacting the solution with alumina to form a slurry; and
heating the slurry.

19. A method of manufacturing a composition comprising alumina, the alumina being surface-modified with a perovskite type compound of formula (I);
wherein formula (I) is defined by $A_{x-y}A'_yB_{1-z}B'_zO_3$; where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5;
wherein the composition comprises from 1 to 50 wt. % of the perovskite type compound, based on the total weight of the perovskite type compound and the alumina, the method comprising:
contacting alumina with A, B, and optionally A' and/or B' using one or more salts of A, one or more salts of B and optionally one or more salts of A' and/or one or more salts of B' via incipient wetness impregnation to form an impregnated alumina; and
heating the impregnated alumina.

20. A method of manufacturing a composition comprising alumina, the alumina being surface-modified with a perovskite type compound of formula (I);
wherein formula (I) is defined by $A_{x-y}A'_yB_{1-z}B'_zO_3$; where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5, the method comprising:
providing a solution comprising one or more salts of A, one or more salts of B and optionally one or more salts of A' and/or one or more salts of B';
contacting the solution with alumina to form a slurry;
spray-drying the slurry to form a spray-dried powder; and
heating the spray-dried powder.

21. A method of manufacturing a composition comprising alumina, the alumina being surface-modified with a perovskite type compound of formula (I);
wherein formula (I) is defined by $A_{x-y}A'_yB_{1-z}B'_zO_3$; where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5, the method comprising:
providing an aqueous solution comprising one or more salts of A, one or more salts of B and optionally one or more salts of A' and/or one or more salts of B';

contacting the solution with alumina to form a slurry;
contacting the slurry with a base;
recovering a solid residue from the slurry; and
heating the solid residue.

\* \* \* \* \*